United States Patent
Moll et al.

(10) Patent No.: US 12,282,804 B2
(45) Date of Patent: Apr. 22, 2025

(54) MOBILE DEVICE RESOURCE OPTIMIZED KIOSK MODE

(71) Applicants: Sharon Moll, Wetzikon (CH); Pawel Wawruch, Freienbach (CH); Neken Aritia Symphonie Razafindrabe, Zurich (CH)

(72) Inventors: Sharon Moll, Wetzikon (CH); Pawel Wawruch, Freienbach (CH); Neken Aritia Symphonie Razafindrabe, Zurich (CH)

(73) Assignee: Snap Inc., Santa Monica, CA (US)

( * ) Notice: Subject to any disclaimer, the term of this patent is extended or adjusted under 35 U.S.C. 154(b) by 391 days.

(21) Appl. No.: 17/949,500

(22) Filed: Sep. 21, 2022

(65) Prior Publication Data

US 2024/0095086 A1 Mar. 21, 2024

(51) Int. Cl.
*G06F 9/54* (2006.01)
*G06F 9/50* (2006.01)

(52) U.S. Cl.
CPC ............ *G06F 9/5055* (2013.01); *G06F 9/542* (2013.01); *G06F 9/547* (2013.01)

(58) Field of Classification Search
CPC ....... G06F 9/5005; G06F 9/5055; G06F 9/541
See application file for complete search history.

(56) References Cited

U.S. PATENT DOCUMENTS

| 12,001,878 B2 * | 6/2024 | Gurgul ................... G06F 11/07 |
| 2012/0174206 A1 | 7/2012 | Spear et al. |
| 2016/0216865 A1 | 7/2016 | Kuscher et al. |
| 2018/0005444 A1 * | 1/2018 | Mullins ................. G06T 19/006 |

FOREIGN PATENT DOCUMENTS

WO 2020243574 A1 12/2020

OTHER PUBLICATIONS

International Search Report and Written Opinion for International Application No. PCT/US2023/029078, dated Nov. 14, 2023 (Nov. 14, 2023)—11 pages.

* cited by examiner

*Primary Examiner* — Andy Ho
(74) *Attorney, Agent, or Firm* — CM Law; Stephen J. Weed

(57) ABSTRACT

A resource optimized kiosk mode that improves the mobile experience for creators and users of mobile devices such as an augmented reality (AR)-enabled wearable eyewear device. An eyewear device enters a kiosk mode by receiving a kiosk mode request for an application and, in response to the request, determining which services and application programming interfaces (APIs) are required to execute the selected application. An identification of the determined services and APIs required to execute the selected application are stored and the eyewear device is rebooted. After reboot, the selected application is started, and only the identified services and APIs are enabled. To determine which services and APIs are required to execute the selected application, metadata may be associated with the selected application specifying the services and/or APIs that the selected application requires to use when in operation.

20 Claims, 13 Drawing Sheets

MOBILE DEVICE RESOURCE OPTIMIZED KIOSK MODE

TECHNICAL FIELD

The present disclosure relates to mobile devices. More particularly, but not by way of limitation, the present disclosure describes techniques for providing a resource optimized kiosk mode for resource limited mobile devices such as augmented reality (AR)-enabled wearable eyewear devices.

BACKGROUND

AR devices (such as wearable eyewear devices) are similar to mobile phones but typically more limited when it comes to available resources (battery life, thermal pressure, memory, quality of internet access, location data) and user input (no keyboard, trackpad, mouse or touch screen). Such resource limitations limit the responsiveness of the AR devices and the experiences available to content creators and users of such devices.

BRIEF DESCRIPTION OF THE DRAWINGS

Features of the various implementations disclosed will be readily understood from the following detailed description, in which reference is made to the appended drawing figures. A reference numeral is used with each element in the description and throughout the several views of the drawing. When a plurality of similar elements is present, a single reference numeral may be assigned to like elements.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
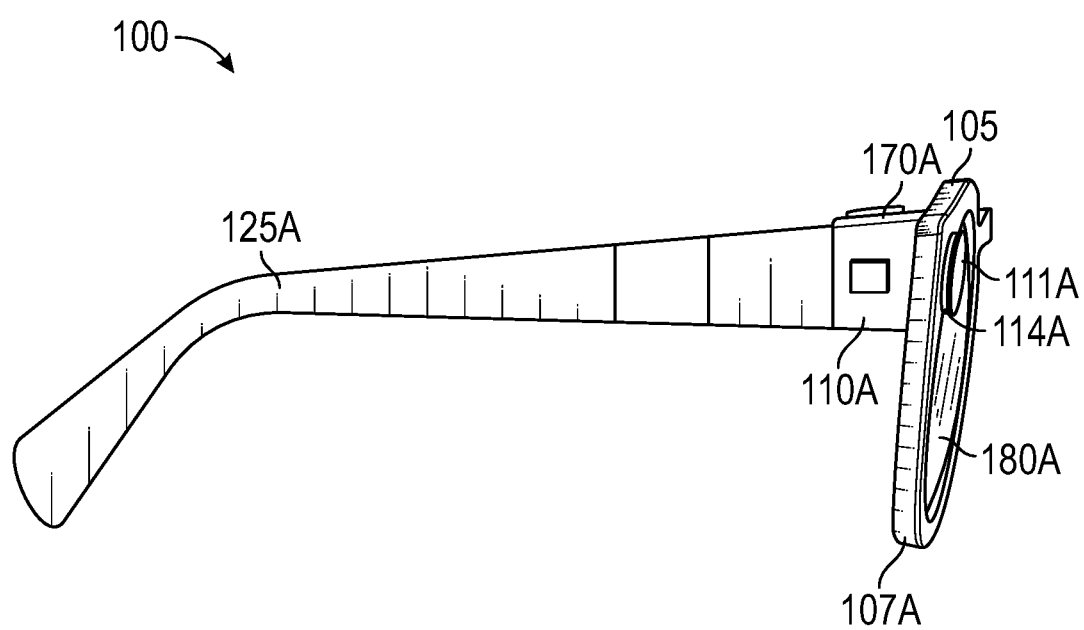
FIG. 1A is a side view of an example eyewear device including an optical assembly with an image display.

A resource optimized kiosk mode is described that improves the mobile experience for content creators and users of mobile devices such as augmented reality (AR)-enabled wearable eyewear devices. The resource optimized kiosk mode enables a single AR application (e.g., a lens implemented in SNAPCHAT® and displayed on SPECTACLES™, both available from Snap, Inc. of Santa Monica, CA) to run with a minimal set of services required by the AR application in order to extend the experience duration due to reduced power usage, to reduce the chance of battery heating and/or damage, to reduce the memory footprint, and to improve the responsiveness of mobile devices such as AR-enabled eyewear devices.

Mobile devices such as AR-enabled eyewear devices are generally designed for a variety of applications. Typical operating systems for such eyewear devices support general purpose applications and thus assume the possibility of context switching. This leads to keeping capabilities running in case they may be needed. Accordingly, the operating systems of conventional AR-enabled eyewear devices typically run a plurality of services providing different Application Programming Interfaces (APIs) and features at all times, even when the AR-enabled eyewear device is running a limited number of services and APIs. This leads to battery drain and depletion of available resources. Even when the AR-enabled eyewear device is running in a kiosk mode that restricts the users from running anything but one or more specific sets of applications, numerous background services and APIs still run, with each service and API impacting the power and memory usage and hence the responsiveness of the AR-enabled eyewear device.

A kiosk mode as described herein enables the user of a mobile device such as AR-enabled eyewear device to run a selected AR application (e.g., lens) exclusively without any unnecessary background services or APIs. Once the kiosk mode is turned on via a paired mobile device and the eyewear device is rebooted, the selected AR application is directly started and shown to the user. The user is not permitted to exit the AR application (e.g., to navigate to a carousel/menu to make another selection) or to switch to another AR application. The chosen AR application is thus "locked" and is the only AR application available to the user. Use cases for such as kiosk mode include, inter alia:

Handing out AR-enabled eyewear devices to museum visitors with a locked guidance AR app;

Handing out AR-enabled eyewear devices to restaurant customers with a locked menu card AR app; and Handing out AR-enabled eyewear devices to trade show booth visitors with a locked promotional AR app.

The system and method described herein thus enable a mobile device such as AR-enabled eyewear device to run a single AR application (e.g., lens) with a minimal set of services required to extend the experience duration by reducing battery usage, reduce the chance of battery heating and/or damage, reduce the memory footprint, improve the responsiveness of the AR-enabled eyewear device, and unlock applications requiring more resources that could not run when the operating system reserves its normal amount of resources. To do so, an indication (e.g., metadata) is provided identifying the services and APIs a specific AR application (e.g., lens) uses and depends on for operation. This indication makes it possible to reboot the operating system of the eyewear device and to shut down those services that will not be required to execute the AR application during operation of the AR-enabled eyewear device in the kiosk mode.

In sample configurations, an eyewear device is configured for a kiosk mode by receiving a request to enter the kiosk mode for a selected application and, in response to the request, determining which services and application programming interfaces (APIs) are required to execute the selected application. An identification of the determined services and APIs required to execute the selected application are stored and the eyewear device is rebooted. After reboot, the selected application is started, and only those services and APIs identified by the identification for execution during operation of the selected application in the kiosk mode are enabled. In sample configurations, determining which services and APIs are required to execute the selected application includes reading metadata associated with the selected application specifying at least one of the services or APIs that the selected application requires to use when in operation. Determining which services and APIs are required to execute the selected application also may include parsing the metadata of the selected application to find a services/API metadata declaration identifying at least one of the services or APIs required to execute the selected application and storing the services/API metadata declaration as the identification. In the sample configurations, enabling only those services of the required APIs in the runtime may include reading the services/API metadata declaration stored in the storage and using the services/API metadata after reboot to determine the services and APIs to be executed for the selected application when the kiosk mode is turned on.

In the sample configurations, when the kiosk mode has been selected and the selected application does not include the services/API metadata declaration, a warning message may be presented on a paired mobile device stating that the selected application is not optimized for the kiosk mode. The eyewear device may then default to run all of the system services and APIs of the eyewear device as when not in kiosk mode.

The following detailed description includes systems, methods, techniques, instruction sequences, and computer program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and methods described because the relevant teachings can be applied or practiced in a variety of ways. The terminology and nomenclature used herein is for the purpose of describing particular aspects only and is not intended to be limiting. In general, well-known instruction instances, protocols, structures, and techniques are not necessarily shown in detail.

The term "connect," "connected," "couple," and "coupled" as used herein refers to any logical, optical, physical, or electrical connection, including a link or the like by which the electrical or magnetic signals produced or supplied by one system element are imparted to another coupled or connected system element. Unless described otherwise, coupled, or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element integrated into or supported by the element.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

The orientations of the eyewear device, associated components and any complete devices incorporating an eye scanner and camera such as shown in any of the drawings, are given by way of example only, for illustration and discussion purposes. In operation for a particular variable optical processing application, the eyewear device may be oriented in any other direction suitable to the particular application of the eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below. A sample eyewear device and associated system and method for providing a resource optimized kiosk mode will be described with respect to FIGS. 1-8.

The system described herein includes three types of hardware components: an eyewear device, a mobile device, and a server. The eyewear device will be described with respect to FIGS. 1-3, the mobile device will be described with respect to FIG. 5, and the server will be described with respect to FIG. 6. The corresponding system will be described with respect to FIG. 4. Operation of the software components, including application software on the eyewear device and mobile device will be described with respect to FIGS. 7-8. Such software components include system software for establishing a resource optimized kiosk mode on AR-enabled eyewear device in a sample configuration.

In sample configurations, eyewear devices with augmented reality (AR) capability are used in the systems described herein. Eyewear devices are desirable to use in the system described herein as such devices are scalable, customizable to enable personalized experiences, enable effects to be applied anytime, anywhere, and ensure user privacy by enabling only the user to see the transmitted information. An eyewear device such as SPECTACLES™ available from Snap, Inc. of Santa Monica, California, may be used without any specialized hardware in a sample configuration.

Figure 2A:
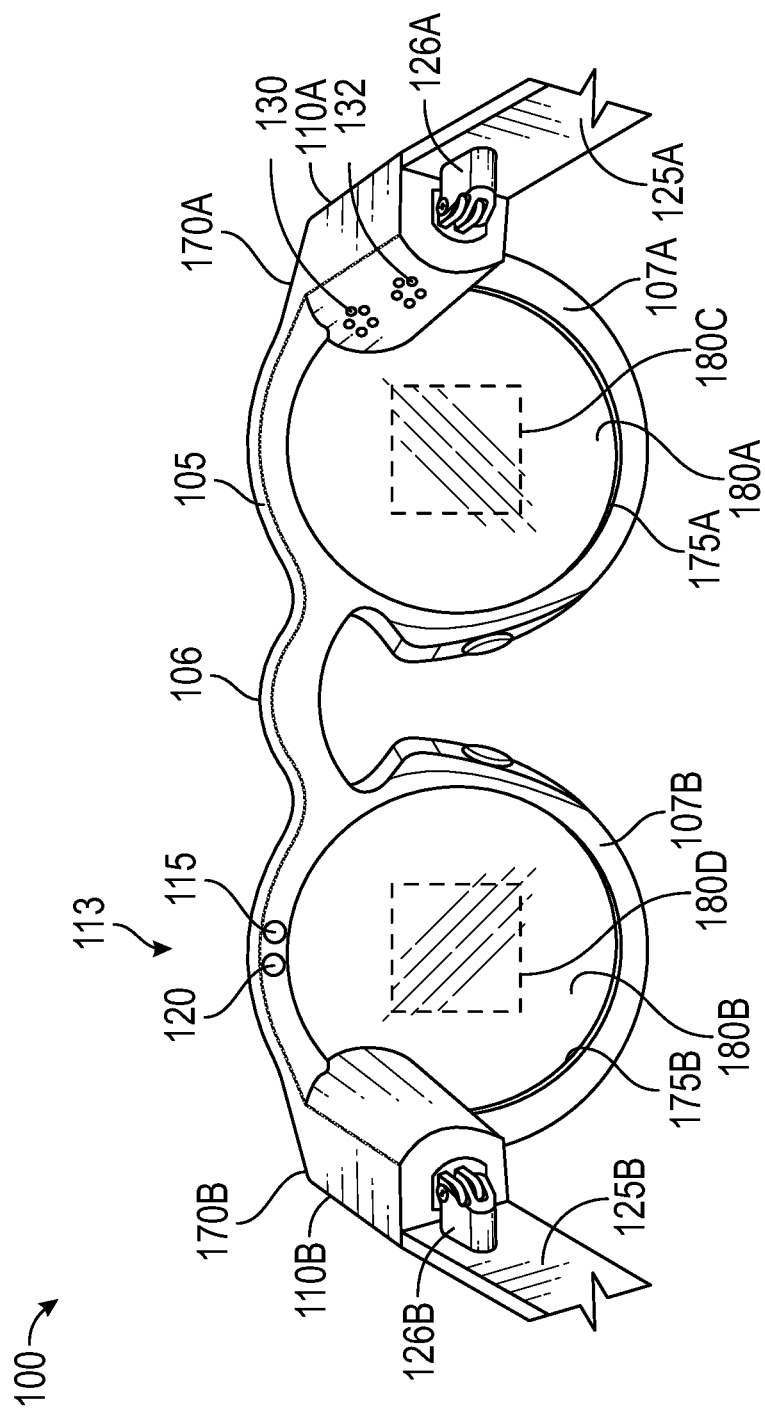
FIGS. 2A-2D are rear views of an example eyewear device depicting an image display.

FIG. 1A is an illustration depicting a side view of an example hardware configuration of an eyewear device 100 including an optical assembly 180A with an image display 180C (FIG. 2A). Eyewear device 100 includes multiple visible light cameras 114A and 114B (FIG. 3) that form a stereo camera, of which one visible light camera 114A is located on a right temple 110A and another visible light camera 114B is located on a left temple 110B (FIG. 2A). In the illustrated example, the optical assembly 180A is located on the right side of the eyewear device 100. The optical assembly 180A can be located on the left side or other locations of the eyewear devices 100.

Figure 3:
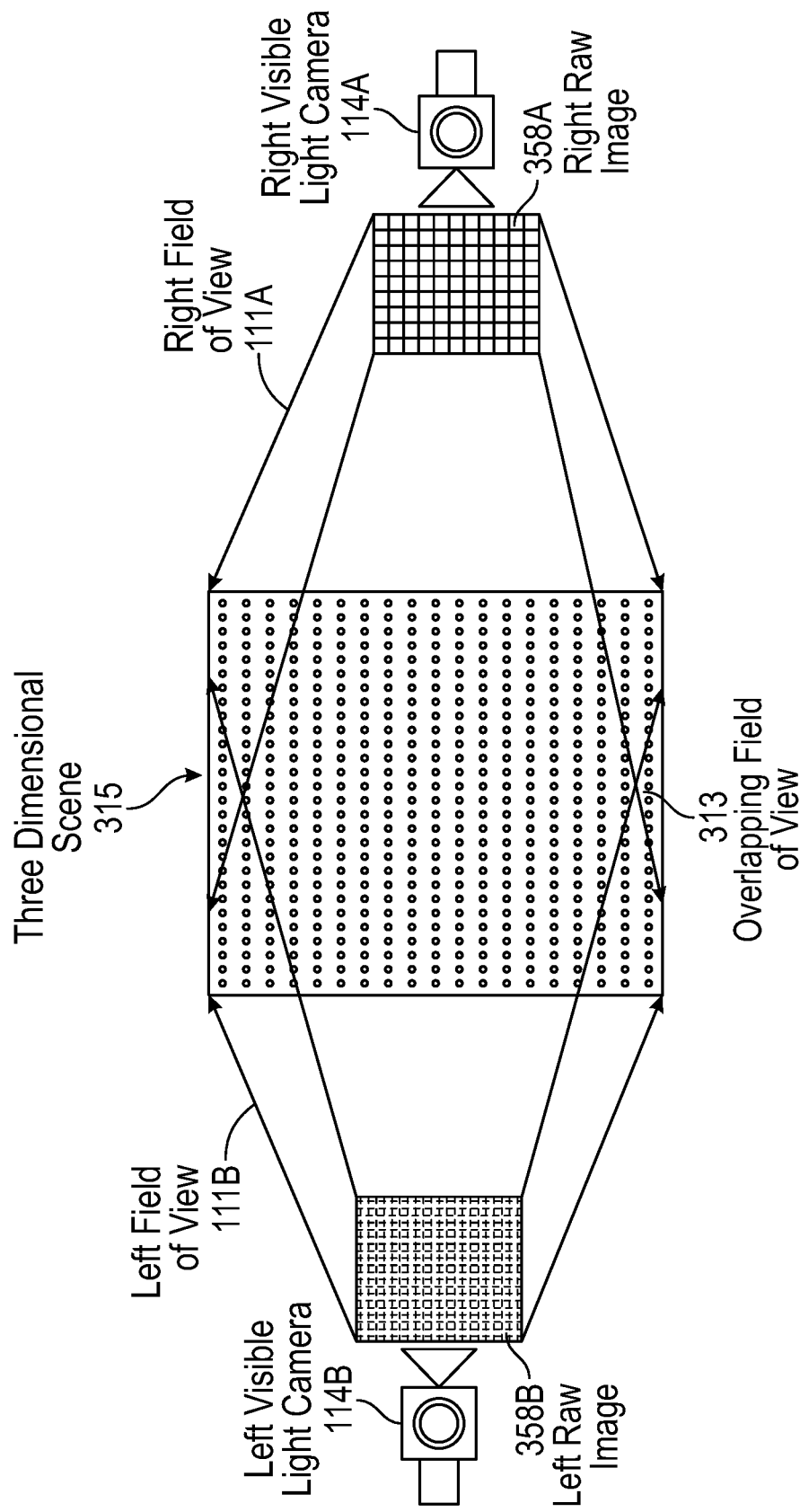
FIG. 3 is a block diagram illustrating an example of capturing visible light using an example eyewear device illustrated in any of the proceeding figures.

The visible light cameras 114A and 114B may include an image sensor that is sensitive to the visible light range wavelength. Each of the visible light cameras 114A and 114B has a different frontward facing angle of coverage, for example, visible light camera 114A has the depicted angle of coverage 111A (FIG. 3). The angle of coverage is an angle range in which the respective image sensor of the visible light cameras 114A and 114B detects incoming light and generates image data. Examples of such visible lights cameras 114A and 114B include a high-resolution complementary metal-oxide-semiconductor (CMOS) image sensor and a video graphic array (VGA) camera, such as 640p (e.g., 640×480 pixels for a total of 0.3 megapixels), 720p, 1080p, 4K, or 8K. Image sensor data from the visible light cameras 114A and 114B may be captured along with geolocation data, digitized by an image processor, and stored in a memory.

To provide stereoscopic vision, visible light cameras 114A and 114B may be coupled to an image processor (element 412 of FIG. 4) for digital processing and adding a timestamp corresponding to the scene in which the image is captured. Image processor 412 may include circuitry to receive signals from the visible light cameras 114A and 114B and to process those signals from the visible light cameras 114A and 114B into a format suitable for storage in the memory (element 434 of FIG. 4). The timestamp may be added by the image processor 412 or other processor that controls operation of the visible light cameras 114A and 114B. Visible light cameras 114A and 114B allow the stereo camera to simulate human binocular vision. Stereo cameras also provide the ability to reproduce three-dimensional images of a three-dimensional scene (scene 315 of FIG. 3) based on two captured images (image pairs 358A and 358B of FIG. 3) from the visible light cameras 114A and 114B, respectively, having the same timestamp. Such three-dimensional images allow for an immersive virtual experience that feels realistic, e.g., for virtual reality or video gaming. For stereoscopic vision, the pair of images 358A and 358B may be generated at a given moment in time—one image for each of the visible light cameras 114A and 114B. When the pair of generated images 358A and 358B from the frontward facing field of view (FOV) 111A and 111B of the visible light cameras 114A and 114B are stitched together (e.g., by the image processor 412), depth perception is provided by the optical assemblies 180A and 180B.

In an example, the eyewear device 100 includes a frame 105, a right rim 107A, a right temple 110A extending from a right lateral side 170A of the frame 105, and a see-through image display 180C (FIGS. 2A-B) comprising optical assembly 180A to present a GUI or other image to a user. The eyewear device 100 includes a visible light camera 114A connected to the frame 105 or the right temple 110A to capture an image of the scene. Eyewear device 100 further includes another visible light camera 114B connected to the frame 105 or the left temple 110B to capture (e.g., at least substantially simultaneously with the visible light camera 114A) another image of the scene from another viewpoint, which at least partially overlaps the image captured by the visible light camera 114A. Although not shown in FIGS. 1A and 1B, a processor 432 (FIG. 4) is coupled to the eyewear device 100 and is connected to the visible light cameras 114A and 114B and memory 434 (FIG. 4) accessible to the processor 432, and programming in the memory 434 may be provided in the eyewear device 100 itself.

Figure 1B:
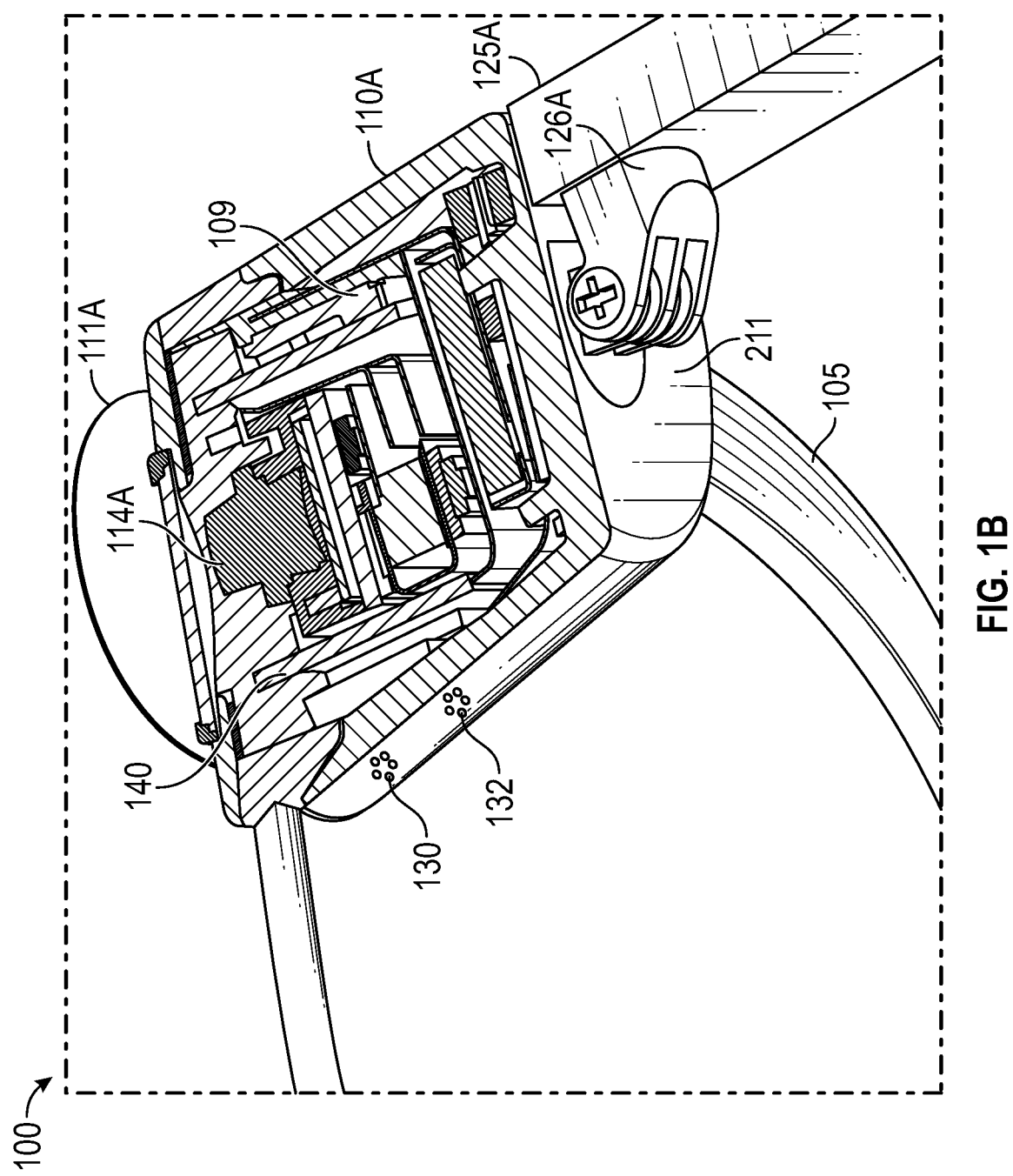
FIG. 1B is a top cross-sectional view of optical components and electronics in a portion of the eyewear device illustrated in FIG. 1A.
Figure 2B:
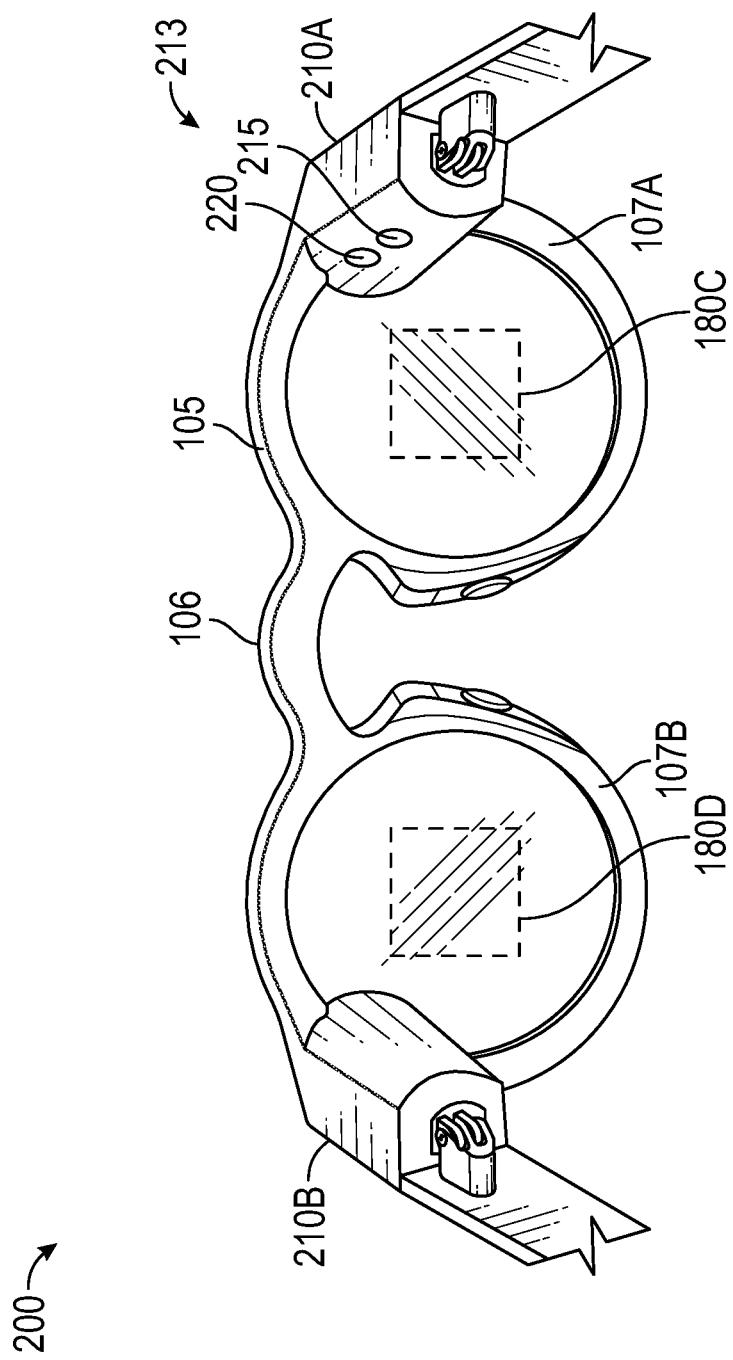
Figure 2C:
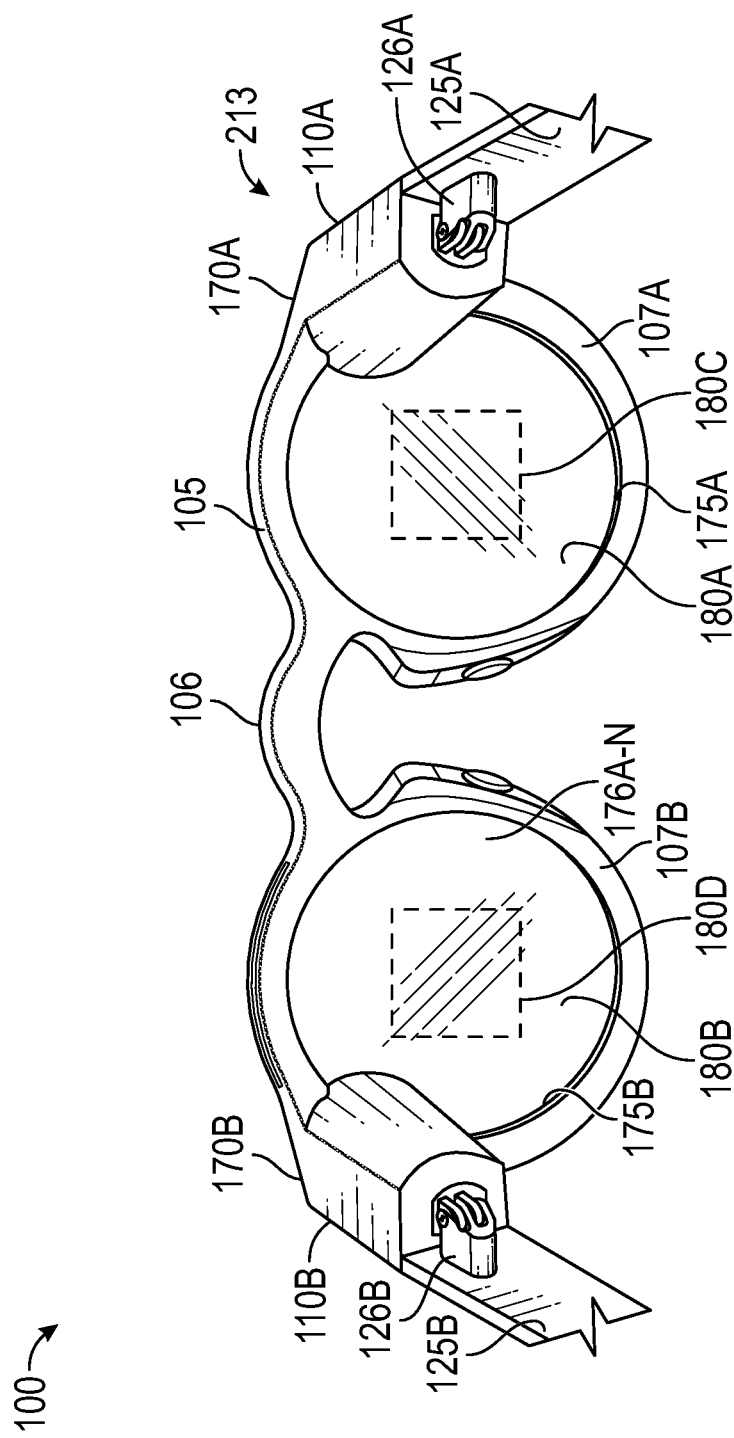

Although not shown in FIG. 1A, the eyewear device 100 also may include a head movement tracker (element 109 of FIG. 1B) or an eye movement tracker (element 113 of FIG. 2A or element 213 of FIGS. 2B and 2C). Eyewear device 100 may further include the see-through image displays 180C and D of optical assemblies 180A and 180B, respectively, for presenting a sequence of displayed images. The eyewear devices 100 may further include an image display driver (element 442 of FIG. 4) coupled to the see-through image displays 180C and 180D to drive the image displays 180C and 180D. The see-through image displays 180C and 180D and the image display driver are described in further detail below. Eyewear device 100 may further include the memory 434 and the processor 432 (FIG. 4) having access to the image display driver 442 and the memory 434, as well as programming in the memory 434. Execution of the programming by the processor 432 configures the eyewear device 100 to perform functions, including functions to present, via the see-through image displays 180C and 180D, an initial displayed image of the sequence of displayed images, the initial displayed image having an initial field of view corresponding to an initial head direction or an initial eye gaze direction as determined by the eye movement tracker 113 or 213.

Execution of the programming by the processor 432 may further configure the eyewear device 100 to detect movement of a user of the eyewear device 100 by: (i) tracking, via the head movement tracker (element 109 of FIG. 1B), a head movement of a head of the user, or (ii) tracking, via an eye movement tracker (element 113 of FIG. 2A or element 213 of FIGS. 2B and 2C), an eye movement of an eye of the user of the eyewear device 100. Execution of the programming by the processor 432 may further configure the eyewear device 100 to determine a field of view adjustment to the initial field of view of the initial displayed image based on the detected movement of the user. The field of view adjustment may include a successive field of view corresponding to a successive head direction or a successive eye direction. Execution of the programming by the processor 432 may further configure the eyewear device 100 to generate successive displayed images of the sequence of displayed images based on the field of view adjustment. Execution of the programming by the processor 432 may further configure the eyewear device 100 to present, via the see-through image displays 180C and 180D of the optical assemblies 180A and 180B, the successive displayed images.

FIG. 1B is an illustration depicting a top cross-sectional view of optical components and electronics in a portion of the eyewear device 100 illustrated in FIG. 1A depicting the visible light camera 114A, a head movement tracker 109, and a circuit board 140. Construction and placement of the visible light camera 114B is substantially similar to the visible light camera 114A, except the connections and coupling are on the other lateral side 170B (FIG. 2A). As shown, the eyewear device 100 includes the visible light camera 114A and a circuit board, which may be a flexible printed circuit board (PCB) 140. A hinge 126A connects the right temple 110A to a hinged arm 125A of the eyewear device 100. In some examples, components of the visible light camera 114A, the flexible PCB 140, or other electrical connectors or contacts may be located on the right temple 110A or the hinge 126A.

As shown, eyewear device 100 may include a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyroscope, and magnetometer per axis for each of the three axes: horizontal axis for left-right movement (X), vertical axis (Y) for top-bottom movement, and depth or distance axis for up-down movement (Z). The accelerometer detects the gravity vector. The magnetometer defines the rotation in the magnetic field (e.g., facing south, north, etc.) like a compass that generates a heading reference. The three accelerometers detect acceleration along the horizontal, vertical, and depth axis defined above, which can be defined relative to the ground, the eyewear device 100, or the user wearing the eyewear device 100.

Eyewear device 100 may detect movement of the user of the eyewear device 100 by tracking, via the head movement tracker 109, the head movement of the user's head. The head movement includes a variation of head direction on a horizontal axis, a vertical axis, or a combination thereof from the initial head direction during presentation of the initial displayed image on the image display. In one example, tracking, via the head movement tracker 109, the head movement of the user's head includes measuring, via the inertial measurement unit, the initial head direction on the horizontal axis (e.g., X axis), the vertical axis (e.g., Y axis), or the combination thereof (e.g., transverse or diagonal movement). Tracking, via the head movement tracker 109, the head movement of the user's head further includes measuring, via the inertial measurement unit, a successive head direction on the horizontal axis, the vertical axis, or the combination thereof during presentation of the initial displayed image.

Tracking, via the head movement tracker 109, the head movement of the user's head may include determining the variation of head direction based on both the initial head direction and the successive head direction. Detecting movement of the user of the eyewear device 100 may further include in response to tracking, via the head movement tracker 109, the head movement of the user's head, determining that the variation of head direction exceeds a deviation angle threshold on the horizontal axis, the vertical axis, or the combination thereof. In sample configurations, the deviation angle threshold is between about 3° to 10°. As used herein, the term "about" when referring to an angle means ±10% from the stated amount.

Variation along the horizontal axis slides three-dimensional objects, such as characters, Bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the eyewear device 100 may power down.

As shown in FIG. 1B, the right temple 110A includes temple body 211 that is configured to receive a temple cap, with the temple cap omitted in the cross-section of FIG. 1B. Disposed inside the right temple 110A are various interconnected circuit boards, such as PCBs or flexible PCBs 140, that include controller circuits for visible light camera 114A, microphone(s) 130, speaker(s) 132, low-power wireless circuitry (e.g., for wireless short-range network communication via BLUETOOTH®), and high-speed wireless circuitry (e.g., for wireless local area network communication via WI-FI®).

The visible light camera 114A is coupled to or disposed on the flexible PCB 140 and covered by a visible light camera cover lens, which is aimed through opening(s) formed in the right temple 110A. In some examples, the frame 105 connected to the right temple 110A includes the opening(s) for the visible light camera cover lens. The frame 105 may include a front-facing side configured to face outwards away from the eye of the user. The opening for the visible light camera cover lens may be formed on and through the front-facing side. In the example, the visible light camera 114A has an outward facing angle of coverage 111A with a line of sight or perspective of the right eye of the user of the eyewear device 100. The visible light camera cover lens also can be adhered to an outward facing surface of the right temple 110A in which an opening is formed with an outward facing angle of coverage, but in a different outwards direction. The coupling can also be indirect via intervening components.

The visible light camera 114A may be connected to the see-through image display 180C of the optical assembly 180A to generate a first background scene of a first successive displayed image. The visible light camera 114B may be connected to the see-through image display 180D of the optical assembly 180B to generate a second background scene of a second successive displayed image. The first background scene and the second background scene may partially overlap to present a three-dimensional observable area of the successive displayed image.

Flexible PCB 140 may be disposed inside the right temple 110A and coupled to one or more other components housed in the right temple 110A. Although shown as being formed on the circuit boards 140 of the right temple 110A, the visible light camera 114A can be formed on another circuit board (not shown) in one of the left temple 110B, the hinged arm 125A, the hinged arm 125B, or the frame 105.

FIG. 2A is an illustration depicting a rear view of an example hardware configuration of an eyewear device 100. As shown in FIG. 2A, the eyewear device 100 is in a form configured for wearing by a user, which are eyeglasses in the example of FIG. 2A. The eyewear device 100 can take other forms and may incorporate other types of frameworks, for example, a headgear, a headset, or a helmet.

In the eyeglasses example, eyewear device 100 includes the frame 105 which includes the right rim 107A connected to the left rim 107B via the bridge 106, which is configured to receive a nose of the user. The right and left rims 107A and 107B include respective apertures 175A and 175B, which hold the respective optical elements 180A and 180B, such as a lens and the see-through displays 180C and 180D. As used herein, the term lens is meant to cover transparent or translucent pieces of glass or plastic having curved and flat surfaces that cause light to converge/diverge or that cause little or no convergence/divergence.

Although shown as having two optical elements 180A and 180B, the eyewear device 100 can include other arrangements, such as a single optical element depending on the application or intended user of the eyewear device 100. As further shown, eyewear device 100 includes the right temple 110A adjacent the right lateral side 170A of the frame 105 and the left temple 110B adjacent the left lateral side 170B of the frame 105. The temples 110A and 110B may be integrated into the frame 105 on the respective sides 170A and 170B (as illustrated) or implemented as separate components attached to the frame 105 on the respective sides 170A and 170B. Alternatively, the temples 110A and 110B may be integrated into hinged arms 125A and 125B attached to the frame 105. A hinge 126B connects the left temple 110B to a hinged arm 125B of the eyewear device 100. In some examples, components of the visible light camera 114B, the flexible PCB (not shown), or other electrical connectors or contacts may be located on the left temple 110B or the hinge 126B.

In the example of FIG. 2A, an eye scanner 113 is provided that includes an infrared emitter 115 and an infrared camera 120. Visible light cameras typically include a blue light filter to block infrared light detection. In an example, the infrared camera 120 is a visible light camera, such as a low-resolution video graphic array (VGA) camera (e.g., 640×480 pixels for a total of 0.3 megapixels), with the blue filter removed. The infrared emitter 115 and the infrared camera 120 may be co-located on the frame 105. For example, both are shown as connected to the upper portion of the left rim 107B. The frame 105 or one or more of the temples 110A and 110B may include a circuit board (not shown) that includes the infrared emitter 115 and the infrared camera 120. The infrared emitter 115 and the infrared camera 120 can be connected to the circuit board by soldering, for example.

Other arrangements of the infrared emitter 115 and infrared camera 120 may be implemented, including arrangements in which the infrared emitter 115 and infrared camera 120 are both on the right rim 107A, or in different locations on the frame 105. For example, the infrared emitter 115 may be on the left rim 107B and the infrared camera 120 may be on the right rim 107A. In another example, the infrared emitter 115 may be on the frame 105 and the infrared camera 120 may be on one of the temples 110A or 110B, or vice versa. The infrared emitter 115 can be connected essentially anywhere on the frame 105, right temple 110A, or left temple 110B to emit a pattern of infrared light. Similarly, the infrared camera 120 can be connected essentially anywhere on the frame 105, right temple 110A, or left temple 110B to capture at least one reflection variation in the emitted pattern of infrared light.

The infrared emitter 115 and infrared camera 120 may be arranged to face inwards towards an eye of the user with a partial or full field of view of the eye to identify the respective eye position and gaze direction. For example, the infrared emitter 115 and infrared camera 120 may be positioned directly in front of the eye, in the upper part of the frame 105 or in the temples 110A or 110B at either ends of the frame 105.

FIG. 2B is an illustration depicting a rear view of an example hardware configuration of another eyewear device 200. In this example configuration, the eyewear device 200 is depicted as including an eye scanner 213 on a right temple 210A. As shown, an infrared emitter 215 and an infrared camera 220 are co-located on the right temple 210A. The eye scanner 213 or one or more components of the eye scanner 213 can be located on the left temple 210B and other locations of the eyewear device 200, for example, the frame 105. The infrared emitter 215 and infrared camera 220 are like that of FIG. 2A, but the eye scanner 213 can be varied to be sensitive to different light wavelengths as described previously in FIG. 2A. Similar to FIG. 2A, the eyewear device 200 includes a frame 105 which includes a right rim 107A which is connected to a left rim 107B via a bridge 106. The rims 107A-B may include respective apertures which hold the respective optical elements 180A and 180B comprising the see-through displays 180C and 180D.

Figure 2D:
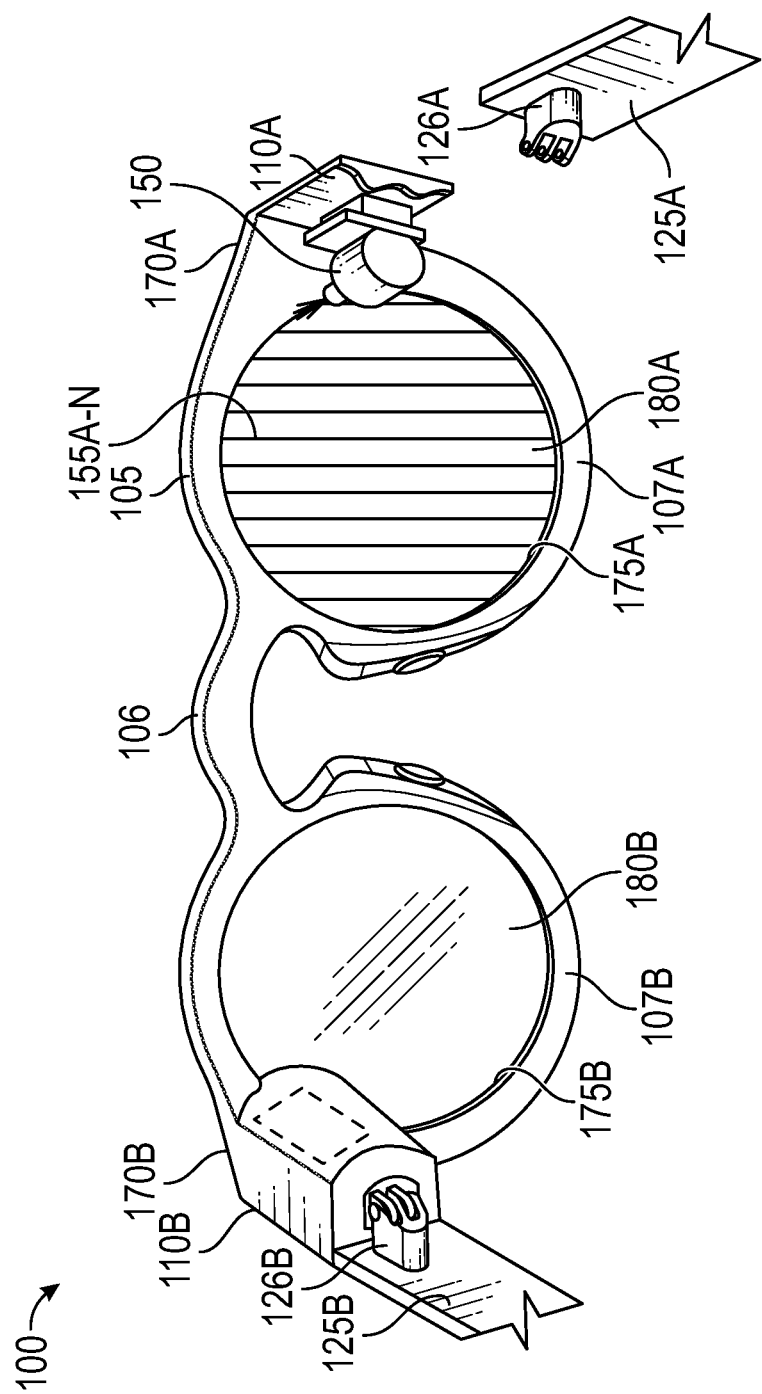

FIG. 2C and FIG. 2D are illustrations depicting rear views of example hardware configurations of the eyewear device 100, including two different types of see-through image displays 180C and 180D. In one example, these see-through image displays 180C and 180D of optical assemblies 180A and 180B include an integrated image display. As shown in FIG. 2C, the optical assemblies 180A and 180B include a display matrix 180C and 180D of any suitable type, such as a liquid crystal display (LCD), an organic light-emitting diode (OLED) display, a waveguide display, or any other such display.

The optical assemblies 180A and 180B also include an optical layer or layers 176A-N, which can include lenses, optical coatings, prisms, mirrors, waveguides, optical strips, and other optical components in any combination. The optical layers 176 can include a prism having a suitable size and configuration and including a first surface for receiving light from display matrix and a second surface for emitting light to the eye of the user. The prism of the optical layers 176 may extend over all or at least a portion of the respective apertures 175A and 175B formed in the rims 107A and 107B to permit the user to see the second surface of the prism when the eye of the user is viewing through the corresponding rims 107A and 107B. The first surface of the prism of the optical layers 176 faces upwardly from the frame 105 and the display matrix overlies the prism so that photons and light emitted by the display matrix impinge the first surface. The prism may be sized and shaped so that the light is refracted within the prism and is directed towards the eye of the user by the second surface of the prism of the optical layers 176. In this regard, the second surface of the prism of the optical layers 176 can be convex to direct the light towards the center of the eye. The prism can be sized and shaped to magnify the image projected by the see-through image displays 180C and 180D, and the light travels through the prism so that the image viewed from the second surface is larger in one or more dimensions than the image emitted from the see-through image displays 180C and 180D.

In another example, the see-through image displays 180C and 180D of optical assemblies 180A and 180B may include a projection image display as shown in FIG. 2D. The optical assemblies 180A and 180B include a projector 150, which may be a three-color projector using a scanning mirror, a galvanometer, a laser projector, or other types of projectors. During operation, an optical source such as a projector 150 is disposed in or on one of the temples 110A or 110B of the eyewear device 100. Optical assemblies 180A and 180B may include one or more optical strips 155A-N spaced apart across the width of the lens of the optical assemblies 180A and 180B or across a depth of the lens between the front surface and the rear surface of the lens.

As the photons projected by the projector 150 travel across the lens of the optical assemblies 180A and 180B, the photons encounter the optical strips 155. When a particular photon encounters a particular optical strip, the photon is either redirected towards the user's eye, or it passes to the next optical strip. A combination of modulation of projector 150, and modulation of optical strips, may control specific photons or beams of light. In an example, a processor controls the optical strips 155 by initiating mechanical, acoustic, or electromagnetic signals. Although shown as having two optical assemblies 180A and 180B, the eyewear device 100 can include other arrangements, such as a single or three optical assemblies, or the optical assemblies 180A and 180B may have different arrangements depending on the application or intended user of the eyewear device 100.

As further shown in FIG. 2C and FIG. 2D, eyewear device 100 includes a right temple 110A adjacent the right lateral side 170A of the frame 105 and a left temple 110B adjacent the left lateral side 170B of the frame 105. The temples 110A and 110B may be integrated into the frame 105 on the respective lateral sides 170A and 170B (as illustrated) or implemented as separate components attached to the frame 105 on the respective sides 170A and 170B. Alternatively, the temples 110A and 110B may be integrated into the hinged arms 125A and 125B attached to the frame 105.

In one example, the see-through image displays include the see-through image display 180C and the see-through image display 180D. Eyewear device 100 may include apertures 175A and 175B that hold the respective optical assemblies 180A and 180B. The optical assembly 180A may include the see-through image display 180C (e.g., a display matrix, or optical strips and a projector in the right temple 110A). The optical assembly 180B may include the see-through image display 180D (e.g., a display matrix, or optical strips and a projector 150 in right temple 110A). The successive field of view of the successive displayed image may include an angle of view between about 15° to 30°, and more specifically 24°, measured horizontally, vertically, or diagonally. The successive displayed image having the successive field of view represents a combined three-dimensional observable area visible through stitching together of two displayed images presented on the image displays.

As used herein, "an angle of view" describes the angular extent of the field of view associated with the displayed images presented on each of the image displays 180C and 180D of optical assemblies 180A and 180B. The "angle of coverage" describes the angle range that a lens of visible light cameras 114A or 114B or infrared camera 220 can image. Typically, the image circle produced by a lens is large enough to cover the film or sensor completely, possibly including some vignetting (i.e., a reduction of an image's brightness or saturation toward the periphery compared to the image center). If the angle of coverage of the lens does not fill the sensor, the image circle will be visible, typically with strong vignetting toward the edge, and the effective angle of view will be limited to the angle of coverage. The "field of view" is intended to describe the field of observable area which the user of the eyewear device 100 can see through his or her eyes via the displayed images presented on the image displays 180C and 180D of the optical assemblies 180A and 180B. Image display 180C of optical assemblies 180A and 180B can have a field of view with an angle of coverage between 15° to 30°, for example 24°, and have a resolution of 480×480 pixels (or greater; e.g., 720p, 1080p, 4K, or 8K).

Figure 4:
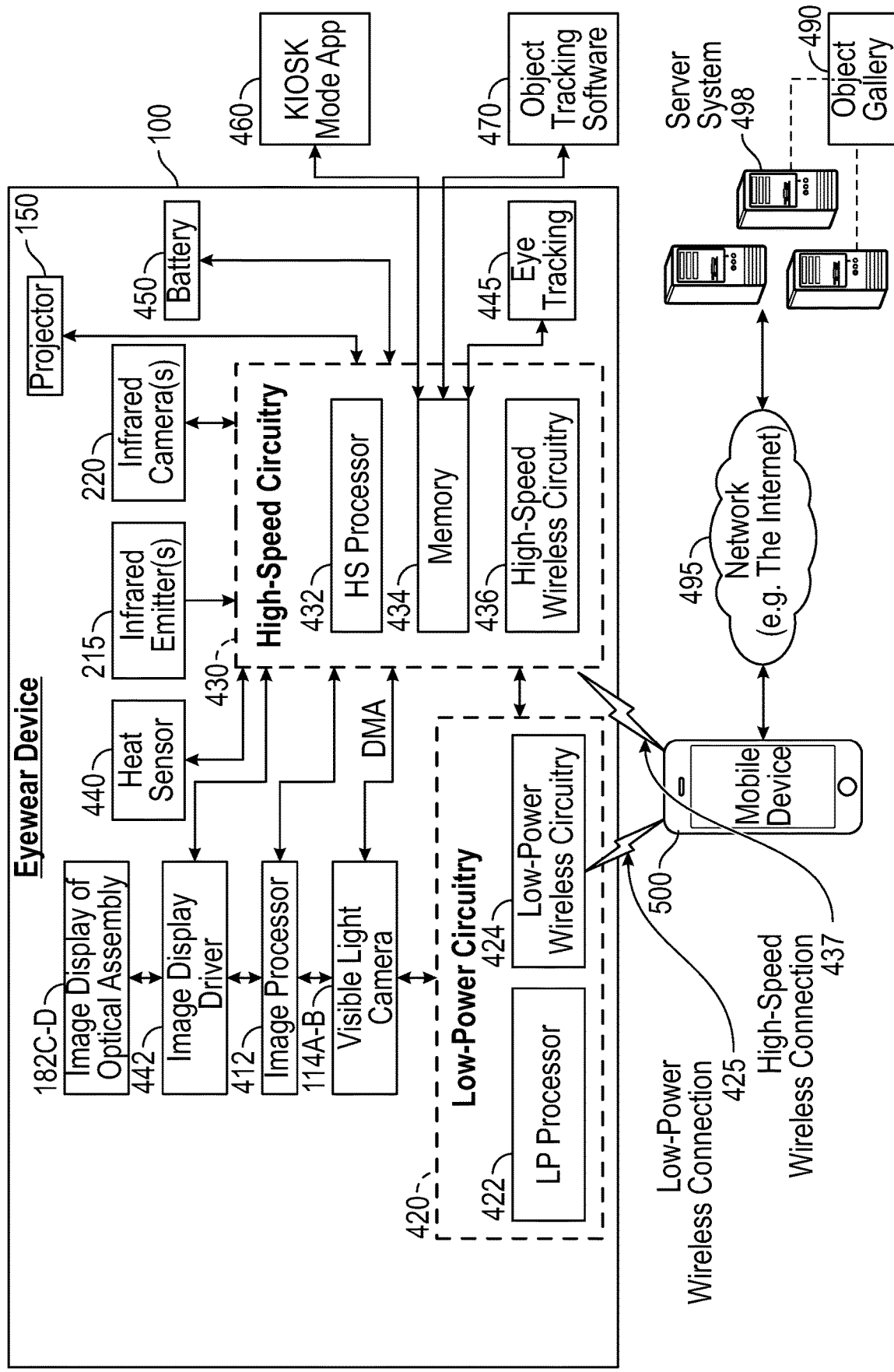
FIG. 4 is a system block diagram of an example eyewear device.

The block diagram in FIG. 3 illustrates an example of capturing visible light with cameras 114A and 114B. Visible light is captured by the visible light camera 114A with a round field of view (FOV) 111A. A chosen rectangular raw image 358A is used for image processing by image processor 412 (FIG. 4). Visible light is also captured by the visible light camera 114B with a round FOV 111B. A rectangular raw image 358B chosen by the image processor 412 is used for image processing by processor 412. The raw images 358A and 358B have an overlapping field of view 313. The processor 412 processes the raw images 358A and 358B and generates a three-dimensional image 315 for display by the displays 180C and 180D. The three-dimensional image 315 is also referred to hereafter as an immersive image.

The system block diagram in FIG. 4 illustrates a high-level functional block diagram including example electronic components disposed in eyewear device 100 or 200 in sample configurations. The illustrated electronic components include the processor 432, the memory 434, and the see-through image displays 180C and 180D.

Memory 434 includes instructions for execution by processor 432 to implement the functionality of eyewear devices 100 and 200, including instructions for high-speed processor 432 to control the image 315. Such functionality may be implemented by processing instructions of eye movement tracking programming 445, kiosk mode application software 460, and object tracking software 470 that is stored in memory 434 and executed by high-speed processor 432. High speed processor 432 receives power from battery 450 and executes the instructions stored in memory 434. The memory 434 may be a separate component, or memory 434 may be integrated with the processor 432 "on-chip" to perform the functionality of eyewear devices 100 and 200 and to communicate with external devices via wireless connections.

The eyewear devices 100 and 200 may incorporate eye movement tracking programming 445 (e.g., implemented using infrared emitter 215 and infrared camera 220 in FIG. 2B) and may provide user interface adjustments via a mobile device 500 (FIG. 5) and a server system 498 connected via various networks. Mobile device 500 may be a smartphone, tablet, laptop computer, access point, or any other such device capable of connecting with the eyewear devices 100 or 200 using both a low-power wireless connection 425 and a high-speed wireless connection 437. Mobile device 500 is further connected to server system 498 via a network 495. The network 495 may include any combination of wired and wireless connections.

Eyewear devices 100 and 200 may include image display driver 442, image processor 412, low-power circuitry 420, and high-speed circuitry 430. The components shown in FIG. 4 for the eyewear devices 100 and 200 are located on one or more circuit boards, for example, a PCB or flexible PCB, in the temples. Alternatively, or additionally, the depicted components can be located in the temples, frames, hinges, hinged arms, or bridge of the eyewear devices 100 and 200. The visible light cameras 114A and 114B can include digital camera elements such as a complementary metal-oxide-semiconductor (CMOS) image sensor, charge coupled device, a lens, or any other respective visible or light capturing elements that may be used to capture data, including images of scenes with unknown objects.

Eye movement tracking programming 445 implements the user interface field of view adjustment instructions, including instructions to cause the eyewear devices 100 or 200 to track, via the eye movement tracker 213, the eye movement of the eye of the user of the eyewear devices 100 or 200. Other implemented instructions (functions) cause the eyewear devices 100 and 200 to determine the FOV adjustment to the initial FOV 111A-B based on the detected eye movement of the user corresponding to a successive eye direction. Further implemented instructions generate a successive displayed image of the sequence of displayed images based on the field of view adjustment. The successive displayed image is produced as visible output to the user via the user interface. This visible output appears on the see-through image displays 180C and 180D of optical assemblies 180A and 180B, which is driven by image display driver 442 to present the sequence of displayed images, including the initial displayed image with the initial field of view and the successive displayed image with the successive field of view.

The kiosk mode application software 460 will be described in further detail below in connection with FIGS. 7-8.

An object tracking model applied by the object tracking software 470 may, for example, detect gestures of the user as well as objects within the environment that are to be recognized by object recognition software associated with the eyewear device 100 or 200 in sample configurations.

As shown in FIG. 4, high-speed circuitry 430 includes high-speed processor 432, memory 434, and high-speed wireless circuitry 436. In the example, the image display driver 442 is coupled to the high-speed circuitry 430 and operated by the high-speed processor 432 in order to drive the image displays 180C and 180D of the optical assemblies 180A and 180B. High-speed processor 432 may be any processor capable of managing high-speed communications and operation of any general computing system needed for eyewear device 100 or 200. High-speed processor 432 includes processing resources needed for managing high-speed data transfers on high-speed wireless connection 437 to a wireless local area network (WLAN) using high-speed wireless circuitry 436. In certain examples, the high-speed processor 432 executes an operating system such as a LINUX operating system or other such operating system of the eyewear device 100 or 200 and the operating system is stored in memory 434 for execution. In addition to any other responsibilities, the high-speed processor 432 executing a software architecture for the eyewear device 100 or 200 is used to manage data transfers with high-speed wireless circuitry 436. In certain examples, high-speed wireless circuitry 436 is configured to implement wireless communication protocols such as Institute of Electrical and Electronic Engineers (IEEE) 802.11 communication standards, also referred to herein as WI-FI®. In other examples, other high-speed communications standards may be implemented by high-speed wireless circuitry 436.

Low-power wireless circuitry 424 and the high-speed wireless circuitry 436 of the eyewear devices 100 and 200 can include short range transceivers (BLUETOOTH®) and wireless wide, local, or wide area network transceivers (e.g., cellular or WI-FI®). Mobile device 500, including the transceivers communicating via the low-power wireless connection 425 and high-speed wireless connection 437, may be implemented using details of the architecture of the eyewear device 100 and 200, as can other elements of network 495.

Memory 434 includes any storage device capable of storing various data and applications, including, among other things, color maps, camera data generated by the visible light cameras 114A-B and the image processor 412, as well as images generated for display by the image display driver 442 on the see-through image displays 180C and 180D of the optical assemblies 180A and 180B. While memory 434 is shown as integrated with high-speed circuitry 430, in other examples, memory 434 may be an independent standalone element of the eyewear device 100 or 200. In certain such examples, electrical routing lines may provide a connection through a system on chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

Server system 498 may be one or more computing devices as part of a service or network computing system, for example, which includes a processor, a memory, and network communication interface to communicate over the network 495 with the mobile device 500 and eyewear devices 100 and 200. Eyewear devices 100 and 200 may be connected with a host computer. For example, the eyewear devices 100 or 200 may be paired with the mobile device 500 via the high-speed wireless connection 437 or connected to the server system 498 via the network 495. Also, a gallery 490 of snapshots and AR objects may be maintained by the server system 498 for each user and invoked by communications providing links to the stored snapshots and AR objects in gallery 490.

Output components of the eyewear devices 100 and 200 include visual components, such as the image displays 180C and 180D of optical assemblies 180A and 180B as described in FIGS. 2C and 2D (e.g., a display such as a liquid crystal display (LCD), a plasma display panel (PDP), a light emitting diode (LED) display, a projector, or a waveguide). The image displays 180C and 180D of the optical assemblies 180A and 180B are driven by the image display driver 442. The output components of the eyewear devices 100 and 200 further include acoustic components (e.g., speakers), haptic components (e.g., a vibratory motor), other signal generators, and so forth. The input components of the eyewear devices 100 and 200, the mobile device 500, and server system 498, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Eyewear devices 100 and 200 may include additional peripheral device elements such as ambient light and spectral sensors, biometric sensors, heat sensor 440, or other display elements integrated with eyewear device 100 or 200. For example, the peripheral device elements may include any I/O components including output components, motion components, position components, or any other such elements described herein. The eyewear devices 100 and 200 can take other forms and may incorporate other types of frameworks, for example, a headgear, a headset, or a helmet.

For example, the biometric components of the eyewear devices 100 and 200 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WI-FI® or BLUETOOTH® transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 425 and 437 from the mobile device 500 via the low-power wireless circuitry 424 or high-speed wireless circuitry 436.

Figure 5:
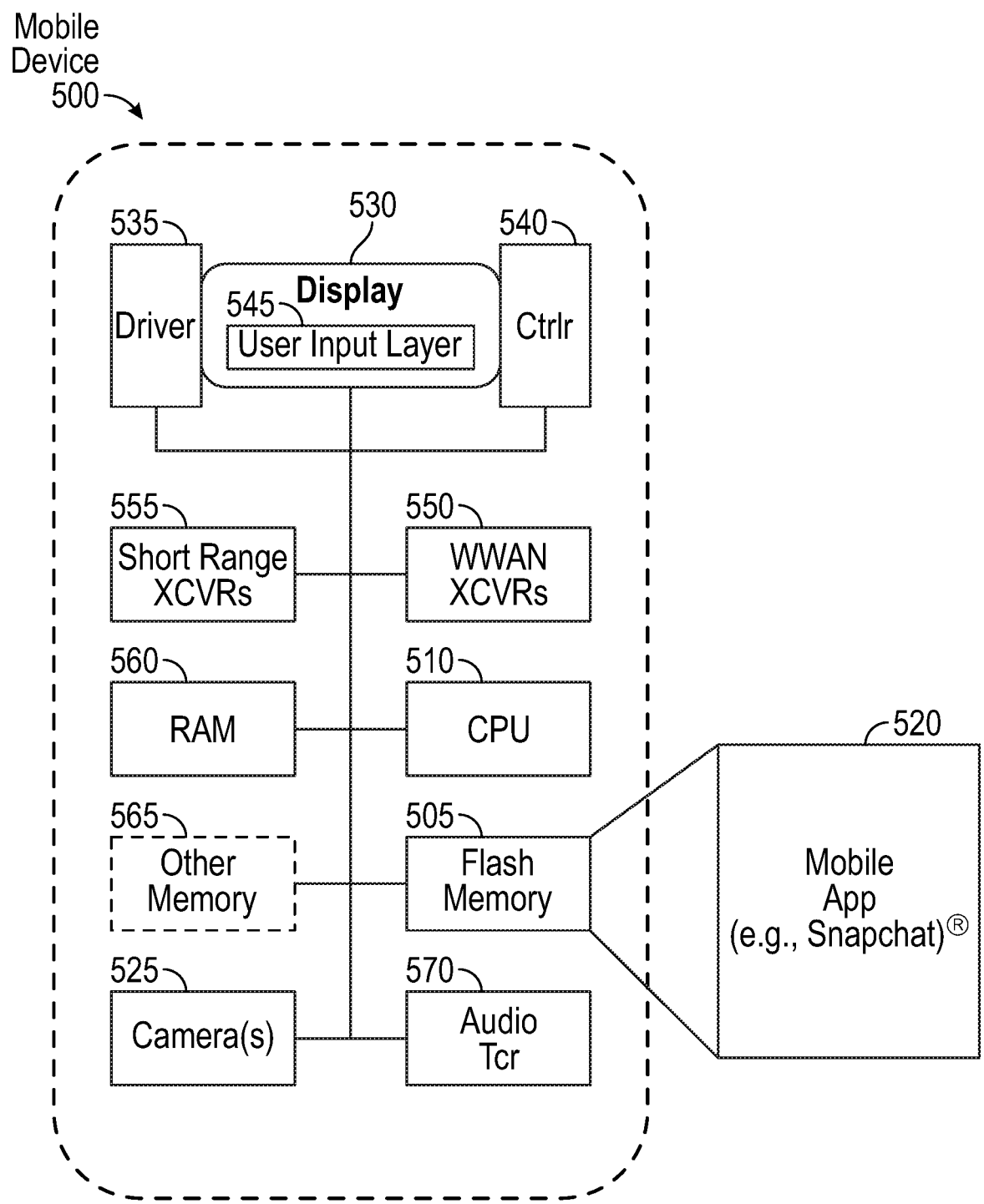
FIG. 5 is a block diagram of electronic components of a mobile device configured for use with the system of FIG. 4.

FIG. 5 is a block diagram depicting a sample configuration of a mobile device 500 for use with the system of FIG. 4. FIG. 5 is a high-level functional block diagram of an example mobile device 500 that a user may use with an eyewear device 100 to extend user interfaces to the eyewear device 100 as described herein. Mobile device 500 may include a flash memory 505 that stores programming to be executed by the CPU 510 to perform all or a subset of the functions described herein. The mobile device 500 may further include a camera 525 that comprises one or more visible-light cameras (visible-light cameras with overlapping fields of view) or at least one visible-light camera and a depth sensor with substantially overlapping fields of view.

Flash memory 505 may further include multiple images or video, which are generated via the camera 525.

The mobile device 500 may further include an image display 530, a mobile display driver 535 to control the image display 530, and a display controller 540. In the example of FIG. 5, the image display 530 may include a user input layer 545 (e.g., a touchscreen) that is layered on top of or otherwise integrated into the screen used by the image display 530. Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 500 with a user interface that includes a touchscreen input layer 545 for receiving input (by touch, multi-touch, or gesture, and the like, by hand, stylus, or other tool) and an image display 530 for displaying content.

As shown in FIG. 5, the mobile device 500 includes at least one digital transceiver (XCVR) 550, shown as WWAN (Wireless Wide Area Network) XCVRs, for digital wireless communications via a wide-area wireless mobile communication network. The mobile device 500 also may include additional digital or analog transceivers, such as short-range transceivers (XCVRs) 555 for short-range network communication, such as via NFC, VLC, DECT, ZigBee, BLUETOOTH®, or WI-FI®. For example, short range XCVRs 555 may take the form of any available two-way wireless local area network (WLAN) transceiver of a type that is compatible with one or more standard protocols of communication implemented in wireless local area networks, such as one of the WI-FI® standards under IEEE 802.11.

To generate location coordinates for positioning of the mobile device 500, the mobile device 500 also may include a global positioning system (GPS) receiver. Alternatively, or additionally, the mobile device 500 may utilize either or both the short range XCVRs 555 and WWAN XCVRs 550 for generating location coordinates for positioning. For example, cellular network, WI-FI®, or BLUETOOTH® based positioning systems may generate very accurate location coordinates, particularly when used in combination. Such location coordinates may be transmitted to the mobile device 500 over one or more network connections via XCVRs 550, 555.

The transceivers 550, 555 (i.e., the network communication interface) may conform to one or more of the various digital wireless communication standards utilized by modern mobile networks. Examples of WWAN transceivers 550 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." The transceivers may also incorporate broadband cellular network technologies referred to as "5G." For example, the transceivers 550, 555 provide two-way wireless communication of information including digitized audio signals, still image and video signals, web page information for display as well as web-related inputs, and various types of mobile message communications to/from the mobile device 500.

The mobile device 500 may further include a microprocessor that functions as the central processing unit (CPU) 510. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU 510. The CPU 510, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 510 or processor hardware in smartphone, laptop computer, and tablet.

The CPU 510 serves as a programmable host controller for the mobile device 500 by configuring the mobile device 500 to perform various operations, for example, in accordance with instructions or programming executable by CPU 510. For example, such operations may include various general operations of the mobile device 500, as well as operations related to the programming for messaging apps and AR camera applications on the mobile device 500. Although a processor may be configured by use of hardwired logic, typical processors in mobile devices are general processing circuits configured by execution of programming.

The mobile device 500 further includes a memory or storage system, for storing programming and data. In the example shown in FIG. 5, the memory system may include flash memory 505, a random-access memory (RAM) 560, and other memory components 565, as needed. The RAM 560 may serve as short-term storage for instructions and data being handled by the CPU 510, e.g., as a working data processing memory. The flash memory 505 typically provides longer-term storage.

Hence, in the example of mobile device 500, the flash memory 505 may be used to store programming or instructions for execution by the CPU 510. Depending on the type of device, the mobile device 500 stores and runs a mobile operating system through which specific applications are executed. Examples of mobile operating systems include Google Android, Apple iOS (for iPhone or iPad devices), Windows Mobile, Amazon Fire OS (Operating System), RIM BlackBerry OS, or the like.

The mobile device 500 may include an audio transceiver 570 that may receive audio signals from the environment via a microphone (not shown) and provide audio output via a speaker (not shown). Audio signals may be coupled with video signals and other messages by a messaging application or social media application implemented on the mobile device 500.

The mobile device 500 may execute mobile application software 520 such as SNAPCHAT® available from Snap, Inc. of Santa Monica, CA that is loaded into flash memory 505. As will be described in more detail below with respect to FIGS. 7-8, the mobile application software 520 communicates with the eyewear device 100 to enable the user of the eyewear device 100 to establish the resource optimized kiosk mode as described herein.

Techniques described herein also may be used with one or more of the computer systems described herein or with one or more other systems. For example, the various procedures described herein may be implemented with hardware or software, or a combination of both. For example, at least one of the processor, memory, storage, output device(s), input device(s), or communication connections discussed below can each be at least a portion of one or more hardware components. Dedicated hardware logic components can be constructed to implement at least a portion of one or more of the techniques described herein. For example, and without limitation, such hardware logic components may include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an ASIC. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionalities, as described herein.

Figure 6:
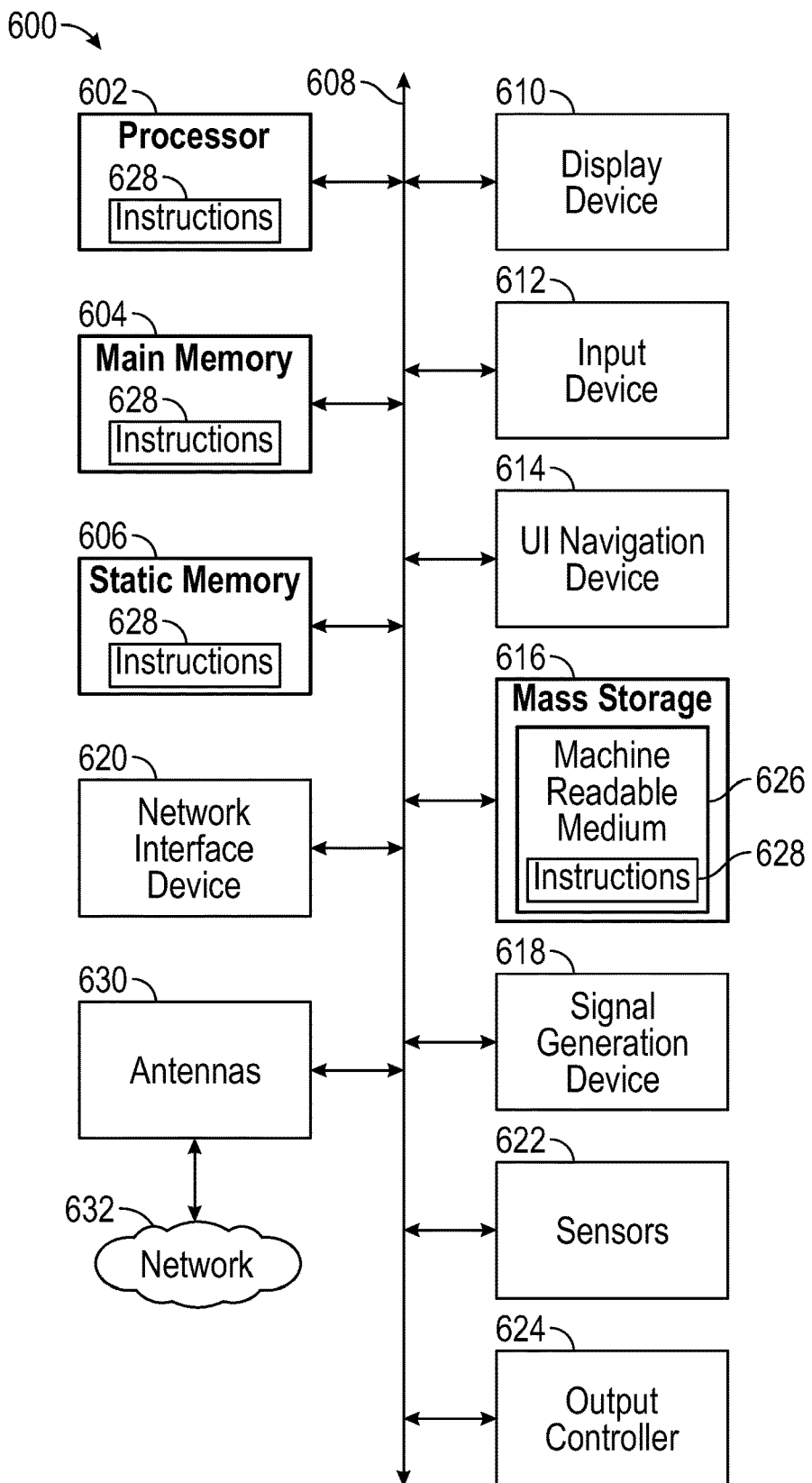
FIG. 6 is a block diagram of a sample back-end server system of the type illustrated in FIG. 4.

The block diagram in FIG. 6 illustrates a computer system for implementation processing elements such as the back-end server system 498 illustrated in FIG. 4. FIG. 6 is a block diagram of a sample machine 600 upon which one or more configurations of a sample back-end server system 498 of the type illustrated in FIG. 4 may be implemented. In alternative configurations, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment.

In sample configurations, the machine 600 may be a personal computer (PC), a tablet PC, a set-top box (STB), a personal digital assistant (PDA), a mobile telephone, a smart phone, a web appliance, a server, a network router, switch or bridge, or any machine capable of executing instructions (sequential or otherwise) that specify actions to be taken by that machine. For example, machine 600 may serve as a workstation, a front-end server, or a back-end server of a communication system. Machine 600 may provide AR applications such as lenses available from Snap, Inc. of Santa Monica, CA that may run as visual overlays or implement other user interface (UI) features during a resource optimized kiosk mode as described herein. Further, while only a single machine 600 is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. The software, when executed by the underlying hardware of the module, causes the hardware to perform the specified operations.

Accordingly, the term "module" is understood to encompass at least one of a tangible hardware or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610 (shown as a video display), an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a mass storage device (e.g., drive unit) 616, a signal generation device 618 (e.g., a speaker), a network interface device 620, and one or more sensors 622. Example sensors 622 include one or more of a global positioning system (GPS) sensor, compass, accelerometer, temperature, light, camera, video camera, sensors of physical states or positions, pressure sensors, fingerprint sensors, retina scanners, or other sensors. The machine 600 also may include an output controller 624, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 616 may include a machine-readable medium 626 on which is stored one or more sets of data structures or instructions 628 (e.g., software) embodying or utilized by any one or more of the techniques or functions described herein. The instructions 628 may also reside, completely or at least partially, within the main memory 604, within static memory 606, or within the hardware processor 602 during execution thereof by the machine 600. In an example, one or any combination of the hardware processor 602, the main memory 604, the static memory 606, or the mass storage device 616 may constitute machine-readable media.

While the machine-readable medium 626 is illustrated as a single medium, the term "machine-readable medium" may include a single medium or multiple media (e.g., at least one of a centralized or distributed database, or associated caches and servers) configured to store the one or more instructions 628. The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories, and optical and magnetic media. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and Digital Video Disks (DVD)-ROM disks. In some examples, machine-readable media may include non-transitory machine-readable media. In some examples, machine-readable media may include machine-readable media that is not a transitory propagating signal.

The instructions 628 may further be transmitted or received over communications network 632 using a transmission medium via the network interface device 620. The machine 600 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as WI-FI®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 620 may include one or more physical jacks (e.g., Ethernet, coaxial, or phone jacks) or one or more antennas 630 to connect to the communications network 632. In an example, the network interface device 620 may include a plurality of antennas 630 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques.

The features and flow charts described herein can be embodied in one or more methods as method steps or in one more applications as described previously. According to some configurations, an "application" or "applications" are program(s) that execute functions defined in the programs. Various programming languages can be employed to generate one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or other mobile operating systems. In this example, the third-party application can invoke API (Application Programming Interface) calls provided by the operating system to facilitate functionality described herein. The applications can be stored in any type of computer readable medium or computer storage device and be executed by one or more general purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of at least one of executable code or associated data that is carried on or embodied in a type of machine-readable medium. For example, programming code could include code for the touch sensor or other functions described herein. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another. Thus, another type of media that may bear the programming, media content or meta-data files includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to "non-transitory," "tangible," or "storage" media, terms such as computer or machine "readable medium" refer to any medium that participates in providing instructions or data to a processor for execution.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read at least one of programming code or data. Many of these forms of computer readable media may be involved in carrying one or more sequences of one or more instructions to a processor for execution.

Features of the mobile device application 520 running on the mobile device 500 as well as the kiosk mode application 460 running on the eyewear device 100 for establishing a resource optimized kiosk mode now will be described with respect to FIGS. 7-8.

In sample configurations, to conserve battery power the mobile device application 520 offers a settings view that requests all available settings knobs (e.g., Boolean values of settings that belong to the category or set of relevant configurations that can be changed within the mobile device application 520) from the AR-enabled eyewear device 100 along with their current value of the settings when navigated to by the user. All available settings may be pulled dynamically from the AR-enabled eyewear device 100 and new settings may be added without the need to update the mobile device application 520 on the paired mobile phone 500. The user may flip the settings toggles and trigger an update of all the values at once using a button. The values may then be sent to the AR-enabled eyewear device 100 in a single remote procedure call (RPC) request, thereby optimizing battery life. Such a system is described in commonly owned U.S. patent application Ser. No. 17/929,985 filed on Sep. 6, 2022, the contents of which are incorporated herein by reference. Alternatively, the settings may be set in the conventional fashion, with the associated additional drain on battery like.

One of the loaded settings may be a "kiosk mode" which can be turned on/off by selecting/deselecting a kiosk bit. When the kiosk mode is turned on, the user may select an AR application (e.g., a lens implemented in SNAPCHAT® and available for use with SPECTACLES™, both available from Snap, Inc. of Santa Monica, CA) to which the AR-enabled eyewear device 100 will be locked. After a reboot of the AR-enabled eyewear device 100, the selected AR application (lens) may be directly started and shown to the user. The user cannot exit the AR application by navigating to a carousel and/or menu or switch to another AR application. The chosen AR application is thus "locked." Since only one AR application is run in the kiosk mode until the AR-enabled eyewear device 100 is rebooted (e.g., when turning off the kiosk mode or selecting another locked AR application for the kiosk mode), only the services and system components that are used and required by the AR application are started and run in the kiosk mode.

It will be appreciated by those skilled in the art that conventional AR applications provide no indication of what services and APIs a specific AR application (e.g., lens) uses and depends upon during operation. Thus, it is presently impossible to shutdown unused services or prevent them from being started after boot. Accordingly, in sample configurations, the AR application files/bundles are modified to include metadata specifying the services and/or APIs that the AR application requires to use when in operation. In sample configurations, the format of the service/API metadata file may be, for example, XML, JSON, and the like. As an XML example of lens metadata identifying the services and/or APIs to be implemented by an AR application in the form of a lens available from Snap, Inc., the XML may take the format:

```
[...]
<lens-apis>
<lens-api name="depth-api" />
<lens-api name="location-api" />
</lens-apis>
[...]
```

A predefined set of API names may be mapped to the set of services required. One API might require two or more system/platform services or a system/platform service might require one or more APIs. The list of used APIs may be defined (manual) by the lens developer that uses Lens Studio available from Snap, Inc. of Santa Monica, CA to create a lens or deduced automatically by static analysis of the AR application in the editor (e.g., for lenses by Lens Studio) to identify the APIs and services used by the AR application. The APIs and services so identified are mapped to the AR application, and the AR application is modified to include the corresponding mapped services/API metadata.

During operation, when the user selects the kiosk mode in the mobile device application 520 and selects the locked AR application (lens), the services/API metadata of the locked AR application is parsed to find the used/required services metadata declaration. Before the AR-enabled eyewear device 100 is rebooted, the services/API metadata for the locked AR application is stored in device storage (e.g., memory 434) of the AR-enabled eyewear device 100. Every service part of the AR-enabled eyewear device 100 reads and uses the services/API metadata after reboot to determine if it is meant to be run/executed or not when the kiosk mode is turned on.

However, when a user turns on the kiosk mode with a locked AR application that does not include the services/API metadata, a warning message is presented on the paired mobile device 500 stating that the locked AR application is not optimized for the kiosk mode. In this scenario, the AR-enabled eyewear device 100 defaults to run all the system services and APIs in the conventional kiosk mode (i.e., without resource optimization).

Figure 7:
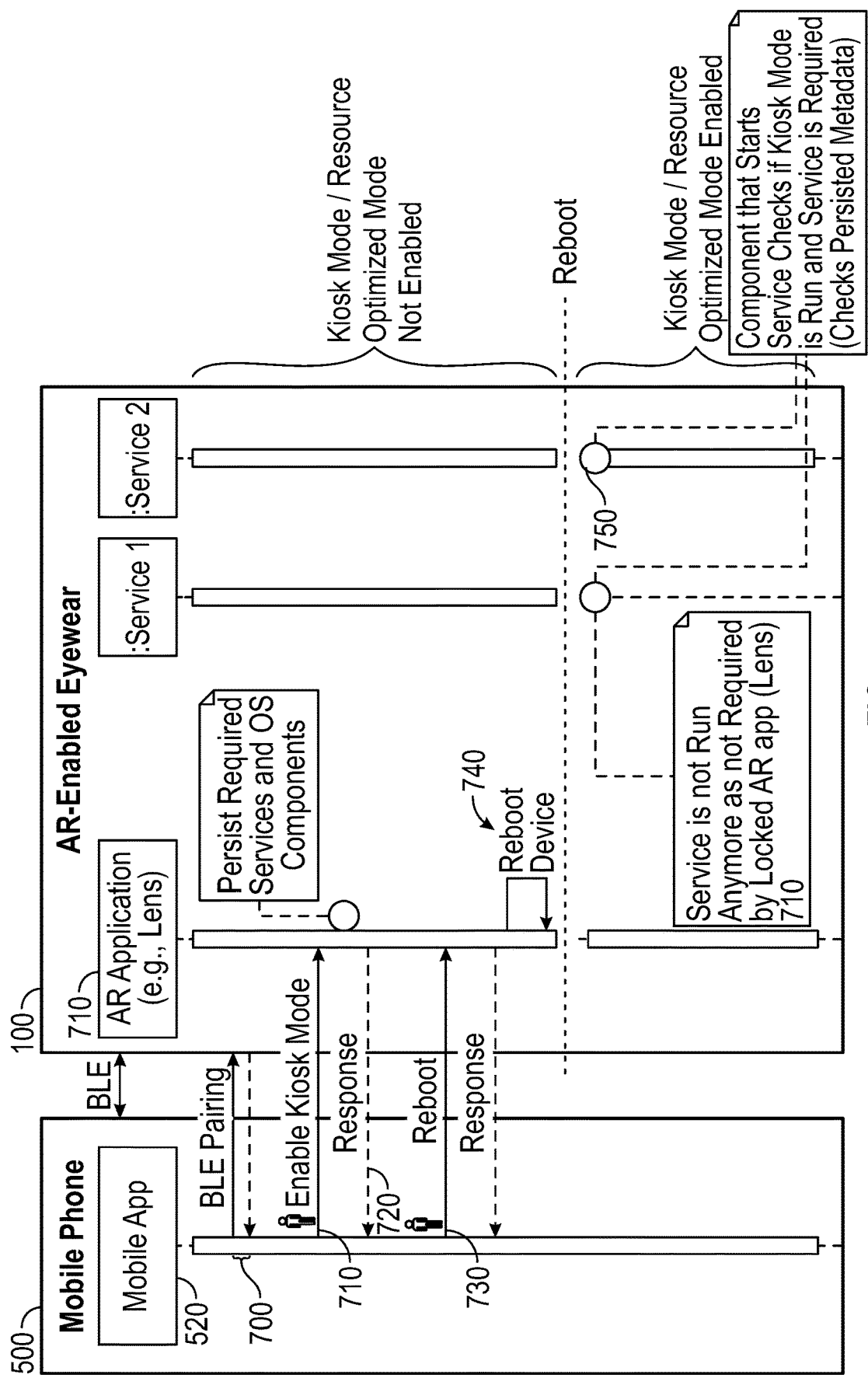
FIG. 7 is a communication diagram of establishing a resource-limited kiosk mode between a mobile device and an eyewear device in a sample configuration.

FIG. 7 is a communication diagram of establishing a resource-limited kiosk mode between a mobile device 500 and an AR-enabled eyewear device 100 in a sample configuration. As illustrated, the user initiates mobile application 520 on the user's mobile device 500 and establishes a BLE (BLUETOOTH® Low Energy) pairing with the associated AR-enabled eyewear device 100 at 700. The user then navigates to settings to enable the kiosk mode of the locked AR application 460 at 710 by selecting the kiosk mode within the settings of mobile application 520. The ID of the locked AR application 460 is provided to the AR-enabled eyewear device 100 and the AR-enabled eyewear device 100 uses the ID of the locked AR application 460 to retrieve the locked AR application 460 from a local store or from the server system 498. In sample configurations, the retrieved AR application 460 may include the services/API metadata identifying all required services and operating system components for the locked AR application 460. The services/API metadata is stored in the AR-enabled eyewear device 100 for access on reboot. Upon receipt of the response 720 indicating successful receipt of the kiosk mode selection and the locked AR application 460, the mobile phone 500 instructs the AR-enabled eyewear device 100 to reboot at 730. Upon successful reboot of the AR-enabled eyewear device 100 at 740, those services and APIs that are not required by the locked AR application 460 become unavailable to the user of the rebooted AR-enabled eyewear device 100.

For example, if the AR-enabled eyewear device 100 implements services 1 and 2 prior to reboot but only service 2 is required to operate locked AR application 460, service 1 is not identified in the services/API metadata identified in the persisted services/API metadata stored on the AR-enabled eyewear device 100 by the component that starts the services. As a result, service 1 does not run after reboot as service 1 is not required by the locked AR application 460. On the other hand, since service 2 is required to operate locked AR application 460, service 2 is identified in the persisted services/API metadata stored on the AR-enabled eyewear device 100 by the component that starts the services. As a result, service 2 is started after reboot, as indicated at 750. In this fashion, the unnecessary service 1 is not run, thus saving battery power and memory. The user stays in the resource optimized kiosk mode until the settings are changed in the mobile device 500 and the AR-enabled eyewear device 100 is rebooted.

It will be appreciated by those skilled in the art that a single mobile device 500 may control the settings of multiple AR-enabled eyewear devices 100 so that the locked AR application 460 need not be set up in respective AR-enabled eyewear devices 100 one-at-a-time. For example, multiple AR-enabled eyewear devices 100 may be setup with the same AR application 460 in parallel, as when setting up multiple AR-enabled eyewear devices 100 for implementing a museum guidance app, a menu card app, or a trade show promotion app for use by multiple users. In each case, only the required services and APIs would be enabled for operation on each AR-enabled eyewear device 100.

Figure 8:
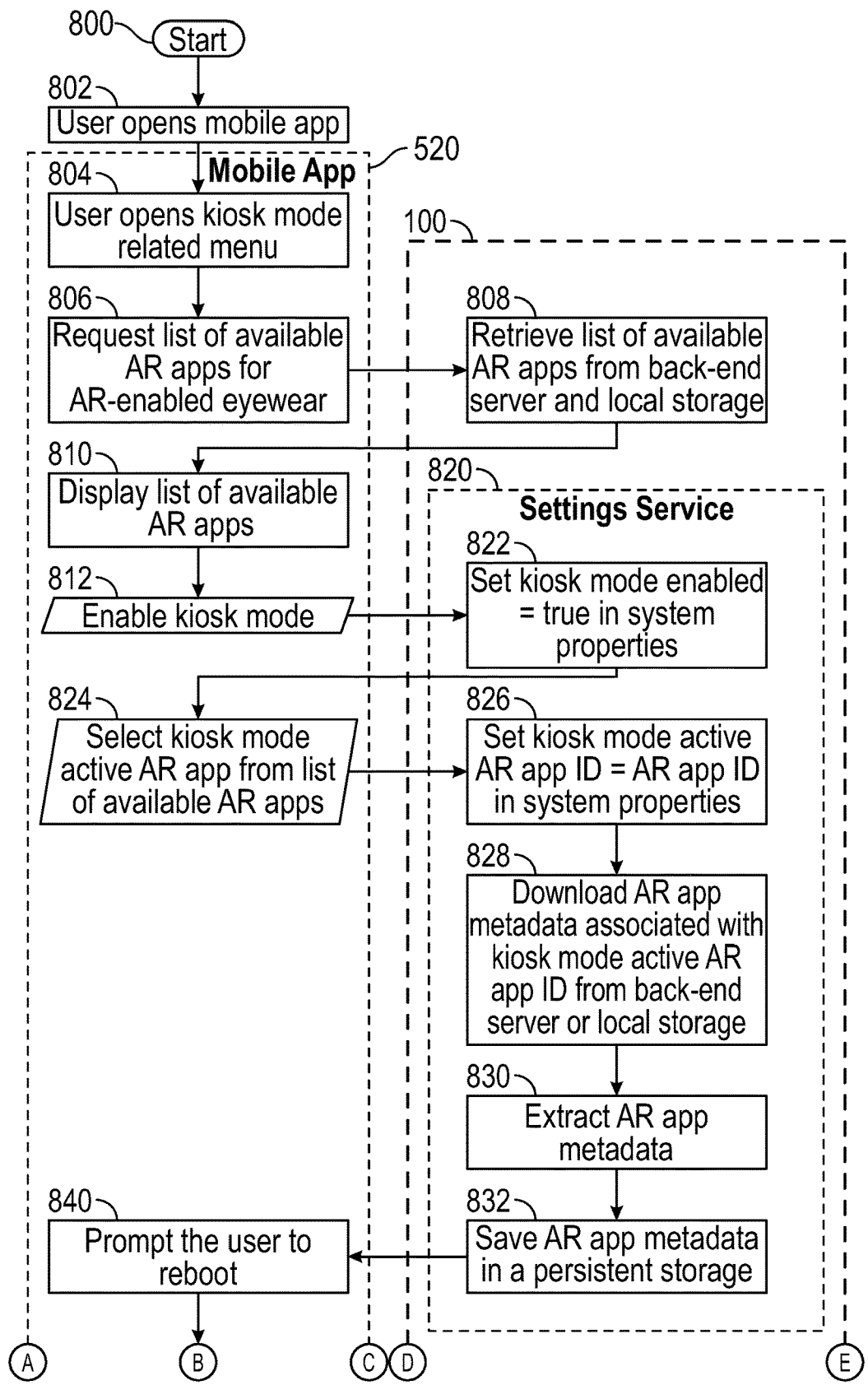
FIG. 8 is a flow chart of the method for setting up a resource-limited kiosk mode on AR-enabled eyewear device using a mobile application of an associated mobile device in a sample configuration.
Figure 8:
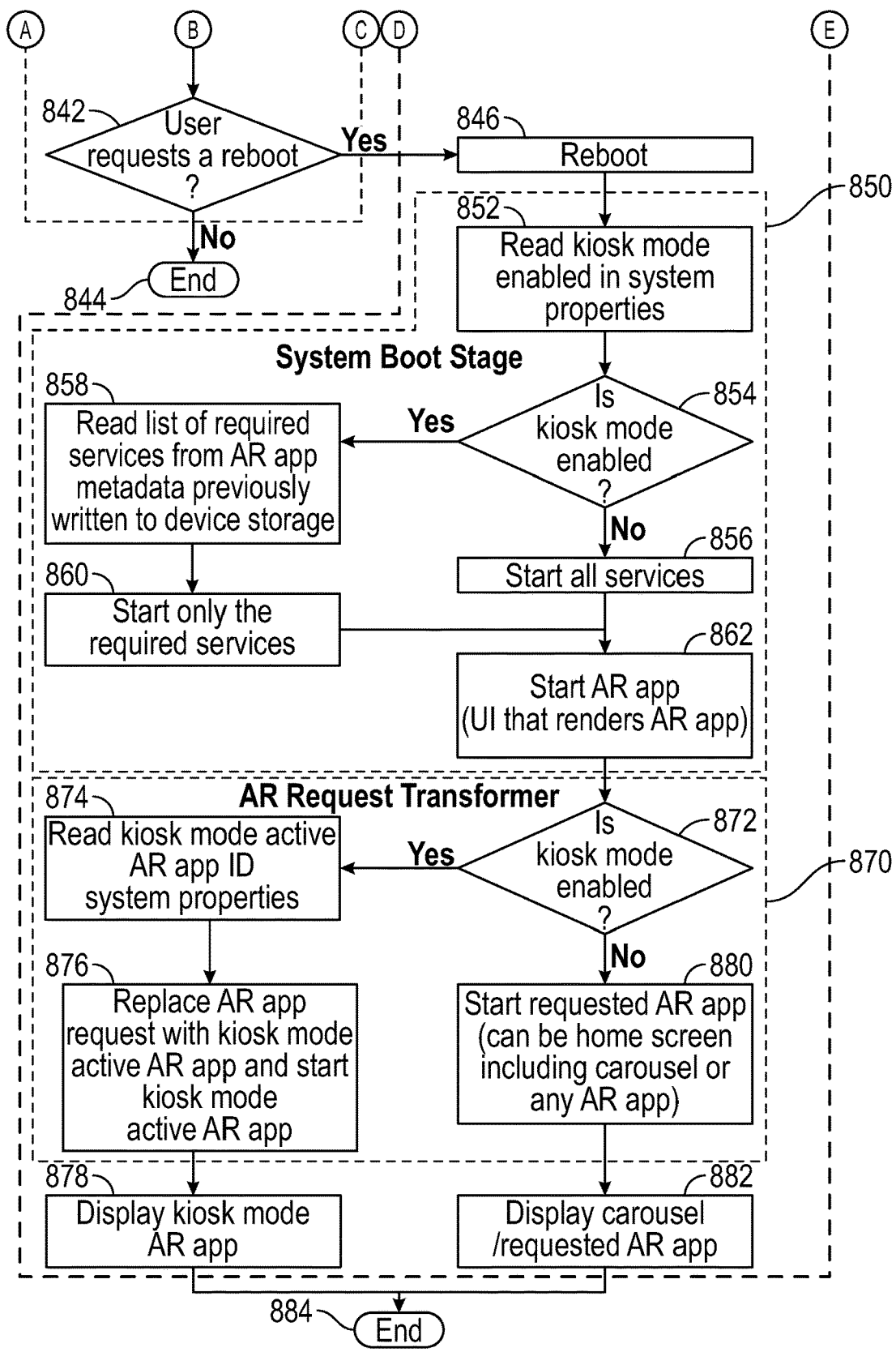

FIG. 8 is a flow chart of a method for setting up a resource-limited kiosk mode on AR-enabled eyewear device 100 using a mobile application 520 of an associated mobile device 500 in a sample configuration. As illustrated, the method starts at 800 by the user opening the mobile app 520 at 802. Upon startup of the mobile app 520, the user is presented with a kiosk mode related menu at 804. For example, the kiosk mode option may be presented in the settings menu of the mobile app 520. At 806, the user may request a list of available AR apps that may be run on the paired AR-enabled eyewear device 100 (e.g., list of lenses that may be run on SPECTACLES™ available from Snap, Inc. of Santa Monica, CA). At 808, the paired AR-enabled eyewear device 100 retrieves a list of available AR apps from the server system 498 and/or the local storage of the AR-enabled eyewear device 100. The list of AR apps (e.g., list of lenses) is provided to the mobile app 520 for display at 810. The user then enables the kiosk mode by, for example, selecting the kiosk mode from the settings menu at 812, and an enable kiosk mode request is sent to the AR-enabled eyewear device 100.

Upon receipt of the request from the mobile app 520 to enable the kiosk mode, the settings service 820 sets a kiosk mode enabled bit to "TRUE" at 822. The user may then select at 824 the kiosk mode active AR app (i.e., locked AR app 460) from the list of available AR apps (e.g., lenses). The ID of the selected AR app (e.g., AR app 460) is provided to the settings service 820, which sets the kiosk mode active AR app to the ID of the selected AR app 460 at 826. The settings service 820 or another service then downloads the settings and services/API metadata associated with the ID of the selected AR app 460 from the server system 498 or from local storage at 828. The services/API metadata of the AR app 460 is extracted at 830 and saved in a persistent storage at 832. A reboot request prompt is then sent to the mobile app 520.

Upon receipt of the reboot request prompt, the user is prompted to reboot the AR-enabled eyewear device 100 by the mobile app 520 at 840. If the user does not opt at 842 to reboot, the process ends at 844 and the AR-enabled eyewear device 100 may implement the conventional kiosk mode (without resource optimization). On the other hand, if the user opts at 842 to reboot the AR-enabled eyewear device 100, the AR-enabled eyewear device 100 is rebooted at 846 and enters the system boot stage 850.

In the system boot stage 850, the boot processor (e.g., high-speed processor 432 of FIG. 4) reads the kiosk mode enabled bit at 852. If the kiosk mode is determined at 854 to not be enabled, all services are started in the conventional fashion at 856. However, if it is determined at 854 that the kiosk mode has been enabled, at 858 the list of required services for the selected AR app 460 is read from the services/API metadata of the selected AR app 460 that was saved to persistent storage at 832. Then, only the required services/APIs for the selected AR app 460 are started at 860. The selected AR app 460 is started and the appropriate user interface (UI) for rendering the selected AR app 460 is presented to the display of the AR-enabled eyewear device 100 at 862.

In sample configurations, whenever there is a request from a component in the system to start an AR app 460, that request is intercepted by an "AR Request Transformer" 870. If the kiosk mode is determined at 872 to be enabled, the selected AR app 460 is locked and no switching to another AR app is allowed other than the active locked AR app 460 for the kiosk mode. In kiosk mode, navigation to the home screen (e.g., AR app carousel) is not allowed. For example, if the kiosk mode is enabled, the ID of the kiosk mode active AR app (the selected AR app 460) is read at 874, and the AR app request is replaced at 876 with the kiosk mode active AR app 460 and the kiosk mode active AR app 460 is started. The locked kiosk mode AR app 460 is displayed on the display of the AR-enabled eyewear device 100 at 878. However, if the kiosk mode is not enabled, the selected AR app 460 is started at 880. The selected AR app 460 in this case (kiosk mode not enabled) may be selected from the home screen (e.g., lens carousel) in the conventional fashion, and the selected AR app 460 and/or the AR app carousel is/are displayed to the display of the AR-enabled eyewear device 100 at 882. The process ends at 884.

In the above configurations, the AR apps may be lenses transferred from a Lens Studio implemented by the server system 498 for use as the UI for the AR-enabled eyewear device 100. Alternatively, a developer could add lenses to the Lens Studio or create new UIs that are selected for display on the AR-enabled eyewear device 100. In each case, those lenses enabled for use in the resource optimized kiosk mode would include services/APIs metadata identifying the required services and APIs for the associated lens. Similarly, for other AR applications besides lenses, the same process may be followed to identify and download the AR applications with metadata identifying the required services and APIs for operating the corresponding AR application.

The scope of protection is limited solely by the claims that now follow. That scope is intended and should be interpreted to be as broad as is consistent with the ordinary meaning of the language that is used in the claims when interpreted considering this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are the best mode and other examples, it is understood that various modifications may be made therein and that the subject matter disclosed herein may be implemented in various forms and examples, and that they may be applied in numerous applications, only some of which have been described herein. It is intended by the following claims to claim all modifications and variations that fall within the true scope of the present concepts.

What is claimed is:

1. An eyewear device, comprising:
   a memory that stores instructions; and
   a processor coupled to the memory, wherein the processor executes the instructions to configure the eyewear device to enter a kiosk mode by executing instructions including:
   in response to a request to enter the kiosk mode for a selected application, determining which services and application programming interfaces (APIs) are required to execute the selected application;
   storing an identification of the determined services and APIs required to execute the selected application;
   rebooting the eyewear device;
   starting the selected application; and
   enabling only those services and APIs identified by the identification for execution during operation of the selected application in the kiosk mode.

2. The eyewear device of claim 1, wherein the processor further executes the instructions to enter/exit the kiosk mode by selecting/deselecting a kiosk bit.

3. The eyewear device of claim 1, wherein during the kiosk mode the selected application is locked whereby a user of the selected application cannot switch to another application or exit the selected application by navigating to at least one of carousel or a menu.

4. The eyewear device of claim 1, wherein the processor executing the instructions to determine which services and APIs are required to execute the selected application comprises reading metadata associated with the selected application specifying at least one of the services or APIs that the selected application requires to use when in operation.

5. The eyewear device of claim 4, wherein the metadata is in a format comprising at least one of extensible markup language (XML) or JavaScript Object Notation (JSON).

6. The eyewear device of claim 4, wherein the metadata comprises a predefined set of APIs that are mapped to a set of services required to execute the selected application.

7. The eyewear device of claim 4, wherein the processor executing the instructions to determine which services and APIs are required to execute the selected application comprises parsing the metadata of the selected application to find a services/API metadata declaration identifying at least one of the services or APIs required to execute the selected application and storing the services/API metadata declaration as the identification.

8. The eyewear device of claim 7, wherein the processor executing the instructions to enable only those services and APIs identified by the identification for execution during operation of the selected application in the kiosk mode comprises reading the services/API metadata declaration and using the services/API metadata declaration after reboot to determine the services and APIs to be executed for the selected application when the kiosk mode is turned on.

9. The eyewear device of claim 7, wherein when the kiosk mode has been selected and the selected application does not include the services/API metadata declaration, the processor further executes the instructions to present a warning message on a paired mobile device stating that the selected application is not optimized for the kiosk mode and defaults to run system services and APIs of the eyewear device in the kiosk mode without enabling only those services and APIs identified by the identification for execution during operation of the selected application in the kiosk mode.

10. The eyewear device of claim 1, wherein the processor executing the instructions to determine which services and APIs are required to execute the selected application comprises receiving an identifier of the selected application and using the identifier of the selected application to retrieve the selected application from at least one of the memory or a server, the retrieved application including services/API metadata identifying all required services and APIs for operation of the selected application.

11. The eyewear device of claim 1, further comprising a request transformer that intercepts requests from a component of the eyewear device to start the selected application and, if the kiosk mode has been enabled, the selected application is locked whereby no switching to another application is allowed other than an active locked application for the kiosk mode.

12. The eyewear device of claim 1, wherein the processor executing the instructions to determine which services and APIs are required to execute the selected application comprises receiving from an associated mobile device a request for all available Boolean values of settings that belong to a category or set of configurations that can be changed by the associated mobile device and, in response, pulling available settings dynamically and adding new settings in a single remote procedure call (RPC) without updating the associated mobile device.

13. A method of configuring an eyewear device to enter a kiosk mode, comprising:

receiving a request to enter the kiosk mode for a selected application;

in response to the request, determining which services and application programming interfaces (APIs) are required to execute the selected application;

storing an identification of the determined services and APIs required to execute the selected application;

rebooting the eyewear device;

starting the selected application; and enabling only those services and APIs identified by the identification for execution during operation of the selected application in the kiosk mode.

14. The method of claim 13, wherein determining which services and APIs are required to execute the selected application comprises reading metadata associated with the selected application specifying at least one of the services or APIs that the selected application requires to use when in operation.

15. The method of claim 14, wherein determining which services and APIs are required to execute the selected application further comprises parsing the metadata of the selected application to find a services/API metadata declaration identifying at least one of the services or APIs required to execute the selected application and storing the services/API metadata declaration as the identification.

16. The method of claim 15, wherein enabling only those services and APIs identified by the identification for execution during operation of the selected application in the kiosk mode comprises reading the services/API metadata declaration and using the services/API metadata after reboot to determine the services and APIs to be executed for the selected application when the kiosk mode is turned on.

17. The method of claim 15, wherein when the kiosk mode has been selected and the selected application does not include the services/API metadata declaration, presenting a warning message on a paired mobile device stating that the selected application is not optimized for the kiosk mode and defaulting to run system services and APIs of the eyewear device in the kiosk mode without enabling only those services and APIs identified by the identification for execution during operation of the selected application in the kiosk mode.

18. The method of claim 14, wherein determining which services and APIs are required to execute the selected application comprises receiving an identifier of the selected application and using the identifier of the selected application to retrieve the selected application from at least one of a memory of the eyewear device or a server, the retrieved application including services/API metadata identifying all required services and APIs for operation of the selected application.

19. The method of claim 13, wherein determining which services and APIs are required to execute the selected application comprises automatically deducing by static analysis of the selected application which services and APIs are used by the selected application during operation.

20. A non-transitory computer-readable storage medium that stores instructions that when executed by at least one processor cause the at least one processor to configure an eyewear device to enter a kiosk mode by performing operations including:

receiving a request to enter the kiosk mode for a selected application;

in response to the request, determining which services and application programming interfaces (APIs) are required to execute the selected application;

storing an identification of the determined services and APIs required to execute the selected application;

rebooting the eyewear device;

starting the selected application; and enabling only those services and APIs identified by the identification for execution during operation of the selected application in the kiosk mode.

* * * * *